US010409552B1

(12) United States Patent
Jara et al.

(10) Patent No.: US 10,409,552 B1
(45) Date of Patent: Sep. 10, 2019

(54) SPEECH-BASED AUDIO INDICATORS

(71) Applicant: Amazon Technologies, Inc., Seattle, WA (US)

(72) Inventors: David Adrian Jara, Renton, WA (US); Timothy Thomas Gray, Seattle, WA (US); Kwan Ting Lee, Bellevue, WA (US); Jae Pum Park, Bellevue, WA (US); Michael Hone, Seattle, WA (US); Grant Hinkson, Seattle, WA (US); Richard Leigh Mains, Edmonds, WA (US); Shilpan Bhagat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/269,755

(22) Filed: Sep. 19, 2016

(51) Int. Cl.
G06F 3/16 (2006.01)
G10L 15/05 (2013.01)
G10L 15/02 (2006.01)

(52) U.S. Cl.
CPC .............. *G06F 3/167* (2013.01); *G10L 15/02* (2013.01); *G10L 15/05* (2013.01); *G10L 2015/025* (2013.01)

(58) Field of Classification Search
CPC ......... G06F 3/167; G10L 15/05; G10L 15/02; G10L 2015/025
See application file for complete search history.

(56) References Cited

U.S. PATENT DOCUMENTS

2003/0220798 A1\* 11/2003 Schmid ................... G10L 15/28
704/276
2005/0253807 A1   11/2005 Hohmann et al.
2006/0057545 A1\*  3/2006 Mozer ...................... G09B 5/06
434/156

(Continued)

OTHER PUBLICATIONS

International Search Report and Written Opinion in PCT/US2017/052159, dated Dec. 22, 2017.

(Continued)

*Primary Examiner* — Mahelet Shiberou
(74) *Attorney, Agent, or Firm* — Pierce Atwood, LLP

(57) ABSTRACT

Systems and methods for displaying an audio indicator including a main portion having a width proportional to a volume of a particular phoneme of an utterance is described herein. In some embodiments, audio data representing an utterance may be received at a speech-processing system from a user device. The speech-processing system may determine a maximum volume amplitude for the utterance, and using the maximum volume amplitude, may determine a normalized amplitude value between 0 and 1 associated with a volume that phoneme's of an utterance are spoken. The speech-processing system may then map the normalized amplitude value(s) to widths for a main portion of an audio indicator, where larger normalized amplitude values may correspond to smaller main portion widths. Display data representing a graphical user interface may then be generated and sent to the user device, where the graphical user interface includes the audio indicator having its main portion of a particular width representative of a volume of each phoneme from the utterance.

20 Claims, 13 Drawing Sheets

(56) References Cited

U.S. PATENT DOCUMENTS

2008/0253592 A1\* 10/2008 Sanders ................ H04S 7/40
381/306
2014/0207452 A1 7/2014 Klein et al.
2016/0004499 A1\* 1/2016 Kim ..................... G06F 3/167
715/716
2016/0163318 A1 6/2016 Wilder et al.
2016/0210966 A1\* 7/2016 Koganei ............... G10L 15/083
2016/0217783 A1\* 7/2016 Konuma ............ G10L 15/1822
2017/0061987 A1\* 3/2017 Kikugawa .......... G06F 3/04883

OTHER PUBLICATIONS

International Preliminary Report on Patentability and Written Opinion for Application No. PCT/US2017/052159, dated Mar. 28, 2019.

\* cited by examiner

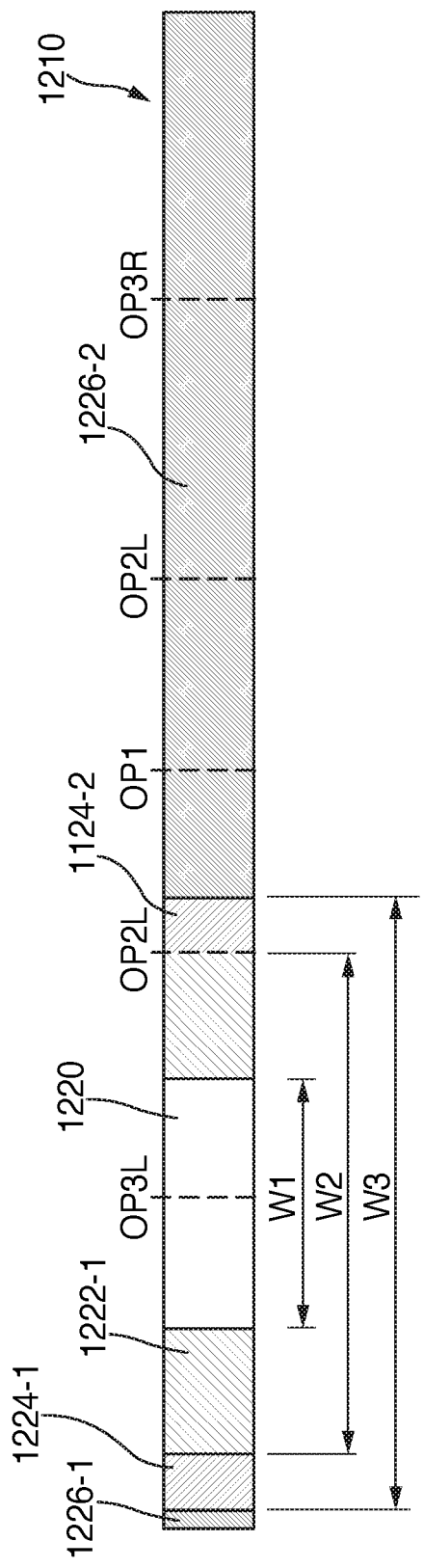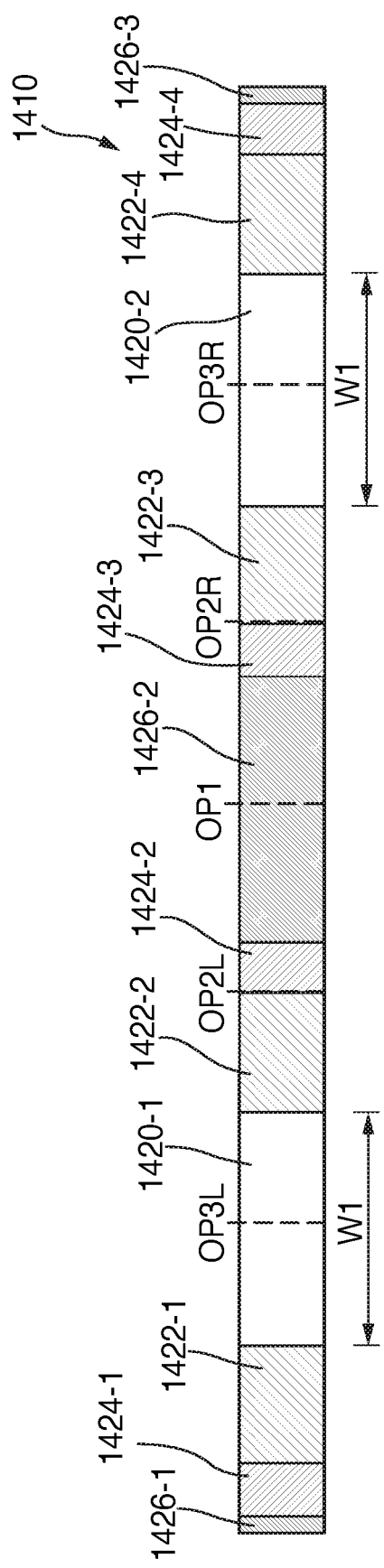

SPEECH-BASED AUDIO INDICATORS

BACKGROUND

Graphical audio visualizers typically focus on providing a visual representation of sound. However, such visualizers tend to be imperfect in allowing individuals to accurately "see" what their brain is "hearing."

BRIEF DESCRIPTION OF THE DRAWINGS

FIG. 12 is another illustrative diagram of an exemplary audio indicator associated with an utterance that is detected to have emanated from a first side of a user device, in accordance with various embodiments;

FIG. 14 is an illustrative diagram of an exemplary audio indicator that indicates that two different utterances were received from two different sources, in accordance with various embodiments.

DETAILED DESCRIPTION

Figure 1:
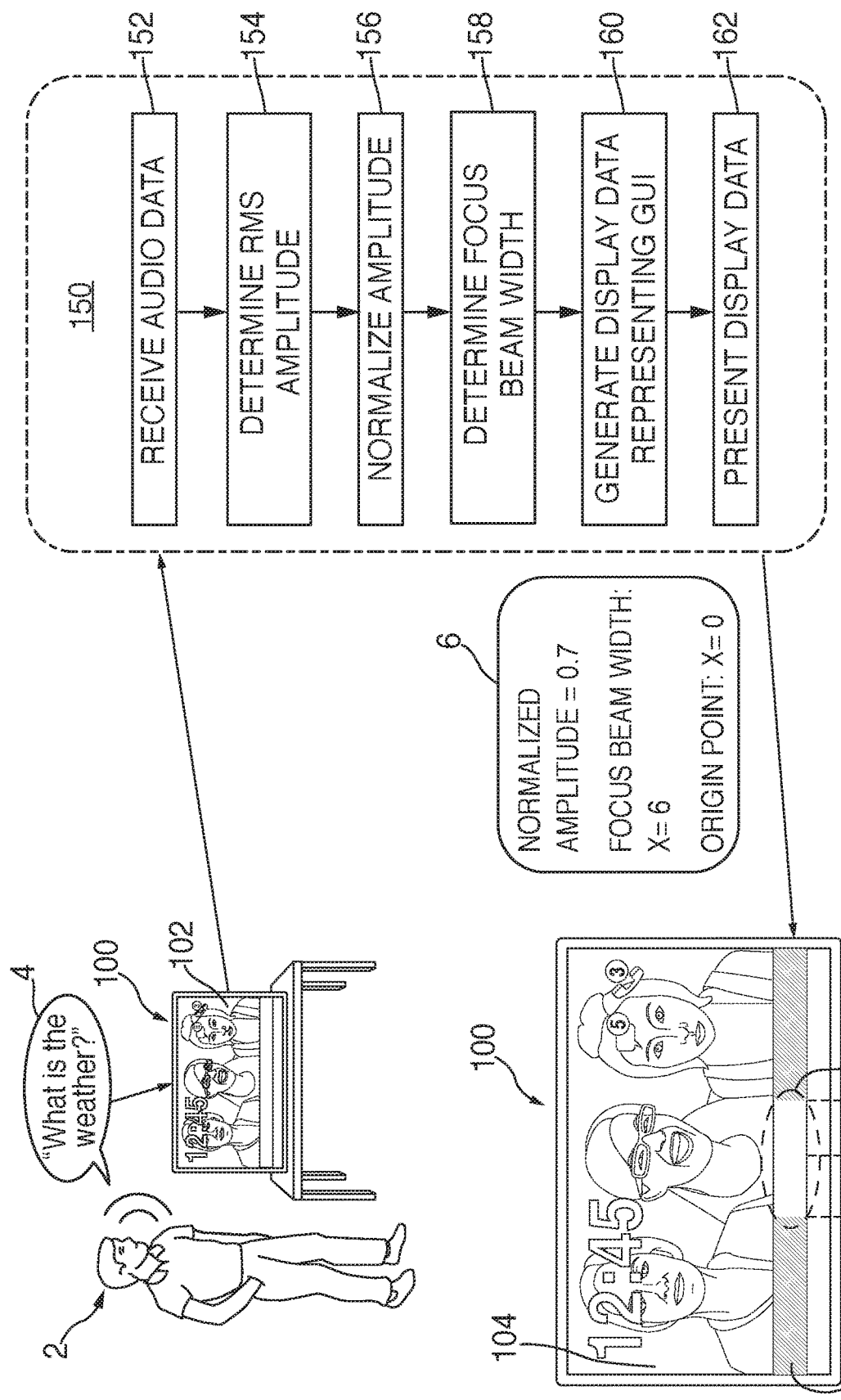
FIG. 1 is an illustrative diagram of an exemplary system for displaying a graphical user interface ("GUI") including an audio indicator on a user device, in accordance with various embodiments.

The present disclosure, as set forth below, is generally directed to various embodiments of methods and devices for displaying a graphical user interface ("GUI") including an audio indicator which is animated or otherwise representative of an apparent volume of sound received by a microphone during a period of time. In particular, the present disclosure includes methods and systems for generating GUIs including an audio indicator such that the audio indicator provides real time, or substantially real time, visual feedback of sounds to replicate the way those sounds are perceived by the human brain.

Described herein are various audio visualizations techniques focused on improving the way a visual representations of sound is created such that the visual representation is as accurate as possible. This improves on simply driving motion in real time (which, as used herein, "real time" includes "near real time") based on a volume of the sound received by a device's microphone(s). As human brains do not "hear" like microphones, the perceived loudness is dependent not only on a sound's volume but also on the sound's frequency and temporal duration, for example. In addition, the human brain filters background noise and bundles sounds together into phonemes and syllables instead of sampling volume amplitude at a predefined sampling rate, as may be done by a microphone.

Embodiments herein may help bridge the gap between how a microphone generates data representing sound and how a human brain interprets that sound. Filters to a microphone's signal may be used to cancel or reduce noise, and apply a root mean square ("RMS") function to that signal to measure loudness. The result may correspond to sampled and peak RMS values within a particular time interval, which may be used to identify a loudness level of specific syllables that have been uttered. The resulting loudness level drives one or more variables that may be used to generate a visual representation of that loudness level corresponding to a phonetic loudness of each specific syllable.

In one embodiment, the main parameters that may be modified for obtaining the correct effect include, without limitation, a maximum volume threshold, a minimum volume threshold, and a frequency of sound data received by the device's microphone(s). For instance, manipulation of these three factors for a particular device may improve that device's results for obtaining the desired look and feel for the audio visualization.

In some embodiments, audio data representing an utterance spoken by an individual may be received at a microphone of a user device. The utterance, for instance, may be prefaced by a trigger expression, and may subsequently be followed by a question, command, request, and/or phrase. In response to determining that the utterance included the trigger expression, the user device may begin sending the audio data representing the utterance to a speech-processing system to determine the utterance's intent, as well as formulate a response, and/or cause one or more actions to occur. Furthermore, in a non-limiting embodiment, in response to determining that the trigger expression was uttered, the user device may be configured to generate and cause an audio indicator to be displayed on a display screen. Additionally, the user device may cause the audio indicator to display a particular visualization pattern.

Upon receiving the audio data, the user device may, in parallel to various speech processing functionalities being performed, generate additional audio data representing the audio data by apply a particular filtering function to the audio data. For example, a root mean square ("RMS") function may be applied to the audio data, to determine an RMS amplitude of the audio data. The user device may sample the microphones at a preconfigured sampling rate in order to obtain the audio data. For example, at each sampling interval, a volume amplitude of sound received by the microphones may be determined. The audio data may then be analyzed by the user device in discrete temporal intervals. For each temporal interval, an RMS amplitude may be determined based on the various volume amplitudes sampled within that temporal interval. Applying the RMS function may assist in filtering out and reducing an amount of background noise that may have been detected by the microphones. Depending on the temporal duration of the utterance, multiple RMS amplitude values, corresponding to multiple discrete temporal intervals, may be obtained. This additional audio data, representing the various RMS amplitude values, may then be used to determine a "loudness" or an intensity of utterance's volume.

In some embodiments, the utterance may have a different volume amplitude associated with each different phoneme spoken. For example, the word "What" may be broken down into one phoneme. This phoneme may be identified with the additional audio data by amplitude as well, indicating the volume of that portion of the utterance. As another example, each word may be broken down into its respective syllables. Therefore, each syllable may be identified within the additional audio data by the amplitude, indicating a volume (e.g., loudness intensity) of that portion of the utterance.

The amplitude values for each syllable may be normalized relative to a preconfigured maximum volume amplitude (as well as using the minimum amplitude during that temporal interval) to determine a normalized amplitude value between zero (e.g., "0") and one (e.g., "1"). In some embodiments, different device types may have different preconfigured maximum and/or minimum volume amplitudes. For example, a mobile device, such as a smartphone or tablet, may have a different maximum and minimum volume amplitude than a non-mobile device, such as a television. The louder a particular phoneme is spoken during a temporal interval, the closer its corresponding normalized amplitude value may be to the maximum amplitude value for that device (e.g., closer to "1"). The quieter a particular phoneme is spoken during a temporal interval, the closer its corresponding normalized amplitude value may be to the minimum amplitude value for that device (e.g., closer to "0"). However, in some embodiments, a determination of the minimum and/or maximum volume amplitudes may be determined in real time. Furthermore, in some embodiments, preconfiguring, or receiving indications of, the maximum and/or minimum volume amplitudes may be optional.

In some embodiments, after determining the normalized amplitude value for a temporal interval, the user device may determine a corresponding width for a main portion of an audio indicator that will be displayed by the user device. For example, each normalized amplitude value (e.g., a number between 0 and 1) may be associated with a particular width of a main portion of the audio indicator, which may allow for a visual representation of the spoken phoneme's volume. For instance, the width may correspond to a particular number of pixels of the user device's display screen, which may be used to represent the main portion of the audio indicator. The audio indicator may allow an individual to see the various intensities of the spoken utterance in real, or substantially near real, time.

In a non-limiting embodiment, the louder in volume that a particular phoneme is spoken, the smaller the width of the main portion of the audio indicator may be. For instance, a large normalized amplitude value may correspond to a small width for the main portion of the audio indicator, whereas a small normalized amplitude value may correspond to a large width for the main portion of the audio indicator. This may enable the individual to perceive that the audio indicator, displayed by the user device, is narrowing in and focusing on the speech as it is being spoken. However, persons of ordinary skill in the art will recognize that the normalize amplitude value may be mapped to a focal point of the audio indicator in any suitable way. For example, larger normalized amplitude values may be associated with smaller widths of the audio indicator, larger widths of the audio indicator, smaller heights of the audio indicator, larger heights of the audio indicator, different positions of the audio indicator, different colors that the audio indicator will be displayed in, or any other visualization effect, or any combination thereof.

In response to determining a width that the main portion of the audio indicator will be for representing a particular temporal interval of an utterance, the user device may generate display data representing some or all of a graphical user interface ("GUI") that includes the audio indicator. The audio indicator, in some embodiments, may be a graphical beam including the main portion which may serve as a focal point. For example, the main portion may be a central portion that is a certain color (e.g., light blue, dark blue, red, etc.), size (e.g., "X" pixels by "Y" pixels, where X and Y are integers), and/or shape (e.g., a square, a rectangle, an oval, etc.), whereas the other portions of the audio indicator may be a different color or colors, size, and/or shape. As an illustrative example, if the audio indicator may be a graphical beam that is a horizontal bar segmented into three portions—a main portion having two non-main portions located on either side, the main portion may be a first width that is associated with the normalized amplitude value such that the main portion is visually distinguishable from the two non-main portions. For instance, the larger the normalized amplitude value, the smaller the width of that main portion. After the display data is generated, the user device may present the display data, thereby causing the GUI to be displayed by the user device's display screen.

In some embodiments, after determining that a second temporal interval, corresponding to a second phoneme of the utterance, has a second amplitude value, the user device may determine a second normalized amplitude value for the second temporal interval. For instance, the second normalized amplitude value may be a number between 0 and 1. The second normalized amplitude value may then be mapped to a particular width for the main portion of the audio indicator, and additional display data representing the GUI including the audio indicator may be generated. For instance, the second phoneme may be uttered at a second volume, which may be less than, equal to, or greater than the first volume of the first phoneme, and therefore the width of the main portion may change from being a first width to a second width, where the second size is respectively greater than, equal to, or less than the first size.

As an illustrative example, the words "What" may be uttered at a first volume level, and the "is" may be uttered at a second volume level. The first and second volume levels may be normalized based on the user device's maximum and minimum amplitudes, and therefore a first normalized value N1 and a second normalized value N2 may be obtained. The first normalized value N1 and the second normalized value N2 may then be mapped to a first width W1 and second width W2, respectively, of the main portion of the audio indicator to be displayed. Therefore, when the audio indicator is displayed on the user device, the main portion will change from being first width W1 to being the second width W2 to replicate the words "What" and "is".

In some embodiments, the received audio data may also indicate a directionality with which the utterance emanated from. For instance, the user device may include one or more microphones and, using those microphones, may be able to determine a direction where the sound originated. The directionality information of the utterance may be reflected by the audio indicator, for instance, to further assist the individual in visualizing the sound. In some embodiment, based on the location that the sound originated, the main portion of the audio indicator may be moved along an axis of the audio indicator. For example, if the sound originated from a left side of the user device, the main portion of the audio indicator may be oriented to a left side of the audio indicator, whereas if the sound originated from the right side of the user device, the main portion of the audio indicator may be oriented to a right side of the audio indicator. Further still, the further to a particular side that an individual is located, and thus the greater angle with which the audio signal is received, the further to that corresponding side the main portion of the audio indicator may be oriented.

In still yet other embodiments, two or more main portions may be displayed by the audio indicator to represent two different sounds (e.g., from two different sources). For example, if two different individuals are speaking, one on either side of the user device, two different main portions for the audio indicator may be displayed on either side of the user device. In this particular scenario, the two different main portions may be of different sizes, shapes, and/or colors such that they are visually distinguishable from their corresponding non-main portions based on the volume with which that individual spoke, a proximity of that individual to the user device, an individual's voice biometric information, or any other input parameter, or any combination thereof, however persons of ordinary skill in the art will recognize that this is merely exemplary.

Spoken voice commands, in some embodiments, may be prefaced by a trigger expression, which may also be referred to as a wakeword, wake expression, or activation word. In response to detecting that the trigger expression was uttered, user device, such as a voice activated electronic device, may be configured to detect and interpret any words that subsequently follow the trigger expression as actionable inputs or commands. In some embodiments, the user device may be activated by a phrase or grouping of words, which the user device may also be configured to detect. The user device, therefore, may also be able to detect and interpret any words subsequently following that phrase or grouping of words.

As used herein, the term "trigger expression" and/or "wakeword" may also correspond to a "keyword" or "key phrase," an "activation word" or "activation words," or a "trigger," or "trigger word." One exemplary wakeword may be a name, such as the name, "Alexa," however persons of ordinary skill in the art will recognize that the any word (e.g., "Amazon" or "Hello"), or series of words (e.g., "Wake Up" or "Hello, Alexa") may alternatively be used as the trigger expression. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger expression that is used to activate a voice activated electronic device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather?" As another example, an utterance may be, "Alexa—Play my workout music." Further still, an utterance, which need not include the wakeword, may be, "Turn up the volume" or "Call 'Mom'."

A voice activated electronic device, such as an electronic device including speech processing functionality and/or in communication with a speech-processing system, may monitor audio input data detected within its local environment using one or more microphones, transducers, or other audio input devices located on, or in communication with, the voice activated electronic device. The voice activated device may, in some embodiments, then provide the audio data representing the detected audio input data to a speech-processing system for processing and analyzing the audio data, which may then generate and send a response to the voice activated electronic device, as well as, or alternatively, communicate with one or more additional computing systems for obtaining content to be rendered by the voice activated electronic device. Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

In some embodiments, the trigger expression may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, a user device may include manual activation functionality. For example, the user device may correspond to a manually activated electronic device. A manually activated electronic device, as described herein, may correspond to a device that is capable of being activated in response to a manual input (e.g., pressing a button, touching a portion of a touch screen, performing an action on a device). For example, a tap-to-talk device is one type of manually activated electronic device. Such tap-to-talk devices, for instance, are capable of obtaining and outputting audio data in response to a button being pressed.

FIG. 1 is an illustrative diagram of an exemplary system for displaying a graphical user interface ("GUI") including an audio indicator on a user device, in accordance with various embodiments. In the non-limiting, exemplary embodiment, an individual 2 speaks utterance 4 within vicinity of a user device 100, which may be displaying a graphical user interface ("GUI") 102 on a display screen. For example, individual 2 may say, "What is the weather?" As another example, utterance 4 may include a wakeword, such as Alexa (e.g., "Alexa—What is the weather?"). In response to determining that utterance 4 included the wakeword (e.g., "Alexa"), user device 100 may begin sending audio data representing utterance 4 to a speech-processing system, which may determine an intent of utterance 4, generate a response, and/or cause one or more actions to occur.

In some embodiments, user device 100, in response to receiving the audio data representing utterance 4, may perform exemplary process 150. Process 150 may be performed substantially in parallel the audio data being sent to the speech-processing system to have speech processing functionalities performed thereto (e.g., speech-to-text functionality, natural language understanding functionality, etc.). In some embodiments, however, the speech-processing system may perform exemplary process 150 in addition to performing one or more speech processing functionalities, however persons of ordinary skill in the art will recognize that this is merely exemplary. As another illustrative embodiment, user device 100 may perform process 150 as well as one or more speech processing functionalities.

Exemplary process 150, in one embodiment, may begin at step 152. At step 152, audio data representing at least a portion of an utterance, such as utterance 4, may be received by user device 100. For example, in response to user device 100 detecting a wakeword, or other trigger (e.g., manual trigger), user device 100 may begin sending audio data representing the spoken utterance to a speech processing system and/or performing one or more additional functionalities. User device 100 may continually record audio data to determine whether that a wakeword was uttered. If so, user device 100 may begin sending that audio data representing the wakeword and any words or sounds spoken thereafter to a speech-processing system. If not, then user device 100 may delete some or all of the audio data, however persons of ordinary skill in the art will recognize that this is merely exemplary.

The audio data representing utterance 4 may, for instance, include information indicating a volume amplitude of utterance 4. In some embodiments, user device 100 includes one or more microphones configured to capture sound at a predefined sampling rate (e.g., 8 kHz). Therefore, for each temporal interval—defined by the inverse of the predefined sampling rate (e.g., for f=8 kHz, T=0.000125 seconds)—sound data may be recorded by microphones of user device 100. As an illustrative example, for a one second utterance at an 8 kHz sampling rate, there are 480,000 sample data points obtained, which indicate a volume level of sound captured by the microphones at each sampling instance. In some embodiments, different device types may be configured to have different sampling rates, which may be based on that device's particular hardware configuration. For example, a mobile device may employ a first sampling rate, whereas a non-mobile device may employ a second sampling rate.

At step 154, a root mean square ("RMS") amplitude is determined using the amplitude obtained from the audio data. For instance, each data point that is obtained via the sampling has an associated volume amplitude. In some embodiments, the audio data may be processed in discrete temporal intervals. For example, every 30 milliseconds, the audio data may be taken, and an RMS amplitude may be determined based on the various volume amplitudes sampled during that temporal interval. This process may be repeated for each temporal interval until and end of utterance 4 is determined. For example, the speech processing system with which the audio data representing utterance 4 is being sent for speech processing may, as one of its functions, determine a speech endpoint of utterance 4. In response to determining the speech endpoint, the speech processing system may send an instruction to user device 100 to stop determining RMS amplitudes for temporal intervals of volume amplitudes that have been sampled.

In some embodiments, an RMS filtering function may be applied to the volume amplitudes sampled for each data point within a given temporal interval to generate additional audio data representing that temporal interval's RMS amplitude value. For example, during temporal interval to there may be N samples $\{s_n\}$. The RMS filtering function therefore, may correspond to finding the RMS sample value for $$\{s_n\} \left( e.g., s_{RMS} = \sqrt{\frac{1}{N}[s_1^2 + s_2^2 + \ldots s_N^2]} \right).$$

In some embodiments, the RMS amplitude values may allow a determination to be made of a maximum volume amplitude threshold value as well as a minimum volume amplitude threshold value for a device type. For example, a user device may be configured to monitor the various RMS amplitude values obtained over a period of time to determine a maximum amplitude value of audio received thereby, as well as a minimum amplitude value. The user device may then store those values for later use as preconfigured threshold values, as described in greater detail below. However, in some embodiments, such maximum and/or minimum RMS amplitude values may be calculated externally, such as during manufacture of the user device, or via software/hardware configurations, and the aforementioned is merely exemplary.

At step 156, a normalized amplitude value may be determined based on the RMS amplitude value determined previously for a particular temporal interval. The normalized amplitude value may corresponds to a number between 0 and 1 (where the bounds 0 and 1 may also be included). For example, a first temporal interval, corresponding to the word "What" being uttered within utterance 4, may yield a first RMS amplitude value that, when normalized relative to a preconfigured maximum volume amplitude value and a minimum volume amplitude value of user device 100, is a first normalized amplitude value. Similarly, different temporal intervals within utterance 4, corresponding to different words (or syllables), may yield different RMS amplitude values, and therefore different normalized amplitude values.

At step 158, a focus beam width may be determined, where the focus beam width may correspond to a width of a main portion of an audio indicator to be displayed within GUI 102 by user device 100. The audio indicator may be used to provide a visual representation of apparent loudness of the spoken words within utterance 4. The main portion of the audio indicator, therefore, provides a focal point for an individual (e.g., individual 2) such that the individual's attention is focused on a particular portion of a displayed GUI. The focus beam width, or width, of the main portion of the audio indicator therefore provides a visual representation of the loudness level of each syllable's phonetic loudness.

To determine the focus beam width, a mapping between the normalized amplitude values and the focus beam widths may be used. For instance, user device 100 may include look-up table, a dynamically changing listing, or any other mapping function, that allows each normalized amplitude value (e.g., between 0 and 1) to be associated with a particular width of the main portion of the audio indicator. For instance, the normalized amplitude value 1 may be associated with a focus beam width of 100% of the display screen, the normalized amplitude value 0 may be associated with a focus beam width of 0% of the display screen, and the normalized amplitude value 0.5 may be associated with a focus beam width of 50% of the display screen. As an illustrative example, for a 1024 pixel by 768 pixel display screen, a normalized amplitude value of 1 may correspond to the focus beam width being 1024 pixels in width. Persons of ordinary skill in the art will recognize that the aforementioned mapping is merely exemplary, and any suitable mapping of the normalized amplitude value to a size, shape, or color of the main portion of the audio indicator may be employed.

At step 160, display data representing the GUI to be displayed by user device 100 may be generated. In some embodiments, the GUI may include the audio indicator, which is to be displayed at a particular portion of the GUI, such as a lower portion. The audio indicator, in one non-limiting embodiment, may be a horizontal bar segmented into one or more portions. For example, the audio indicator may be segmented into three portions, a main portion, a left portion, and a right portion. The main portion, for instance, may be of a certain width, which is based at least in part on the focus beam width previously determined. As the volume amplitude values, the focus beam width may therefore also change, and this display data may include multiple widths for the main portion such that a pattern is displayed. For example, the focus beam width may begin as being a first width, then change to be a second width, followed by a third width, corresponding to a volume at each temporal interval changing from a first volume, to a second volume, to a third volume. This may visually represent each syllable's phonetic loudness from utterance 4. At step 162, user device 100 may present the display data such that the GUI, such as GUI 104, and the audio indicator (e.g., audio indicator 11) including the main portion (e.g., main portion 120) of the determined focus beam width, may be displayed.

Persons of ordinary skill in the art will recognize that different display data, representing different GUIs, or different portion of a GUI, may be generated for each different focus beam width, and the aforementioned is merely exemplary. For example, first display data representing a GUI where a main portion of an audio indicator (e.g., a graphical beam) is a first width, corresponding to a first volume amplitude during a first temporal interval of utterance 4, may be generated and presented by user device 100, where the main portion is visually distinguishable from non-main portions of the graphical beam. As a second focus beam width is determined for a second volume amplitude during a second temporal interval of utterance 4, second display data representing the GUI where the main portion is a second width may be generated and presented to user device 100. This process may be repeated, for instance, until a speech endpoint of utterance 4 is determined, or until any other suitable ending to exemplary process 150 occurs.

Display data 6, in the illustrative, non-limiting embodiment, may include a normalized amplitude value for a particular sound from utterance 4, a focus beam width for the main portion of the audio indicator—which may be determined from the normalized amplitude value, and an indication of an origin point for the main portion to be centered about. As described in greater detail below with reference to FIGS. 9-14, an audio indicator may include multiple positions that can be used for centering the main portion. For example, GUI 104 of FIG. 1, displayed on user device 100 has audio indicator 110 where main portion 120 is centered about a middle of audio indicator 110. Main portion 120, in this particular scenario, is therefore centered at a horizontal position X=0, where audio indicator 110 corresponds to a rectangular bar extending along a lower portion of GUI 104. However, main portion 120 may alternatively be positioned at a left side or a right side of GUI 104.

In some embodiments, as described in greater detail below, audio indicator 110 may be displayed at different locations within a GUI depending on the particular device type that user device 100 corresponds to. For example, for some device types, such as voice activated electronic device including a display screen, audio indicator 110 may be positioned in a vertically center of the GUI (e.g., for a 1024 pixel by 768 pixel display screen, the vertical center would correspond to a vertical position along the 384 pixel height). As other examples, audio indicator 110 may be positioned at a vertical bottom of the GUI (e.g., a vertical position along 0 pixel height), towards a top of the GUI (e.g., a vertical position along approximately 700 pixel height), towards a bottom of the GUI (e.g., a vertical position along approximately 100 pixel height), or at any other suitable position.

As an illustrative example, display data 6 may indicate that the normalized amplitude for a first temporal interval of utterance 4 (or a portion of utterance 4) has a value of 0.7. A normalized amplitude value of 0.7 may map to a focus beam width of X=6 for main portion 120 of audio indicator 110. Alternatively, the focus beam width may be associated with a percentage of a width of audio indicator 110 that may be modified (e.g., have a different color, size, shape, etc.). Furthermore, display data 6 may indicate that main portion 120 is to be centered about an origin point of X=0, which may correspond to a horizontal center of audio indicator 110 (e.g., along a horizontal ("X") axis of GUI 104. Therefore, in response to receiving audio data representing utterance 4, user device 100 may display GUI 104 including audio indicator 110. Audio indicator 110 may include main portion 120, centered at a position of X=0 along a horizontal axis of GUI 104, where main portion 120 may have a width of 6 such (e.g., from X=−3 to X=3).

Figure 2:
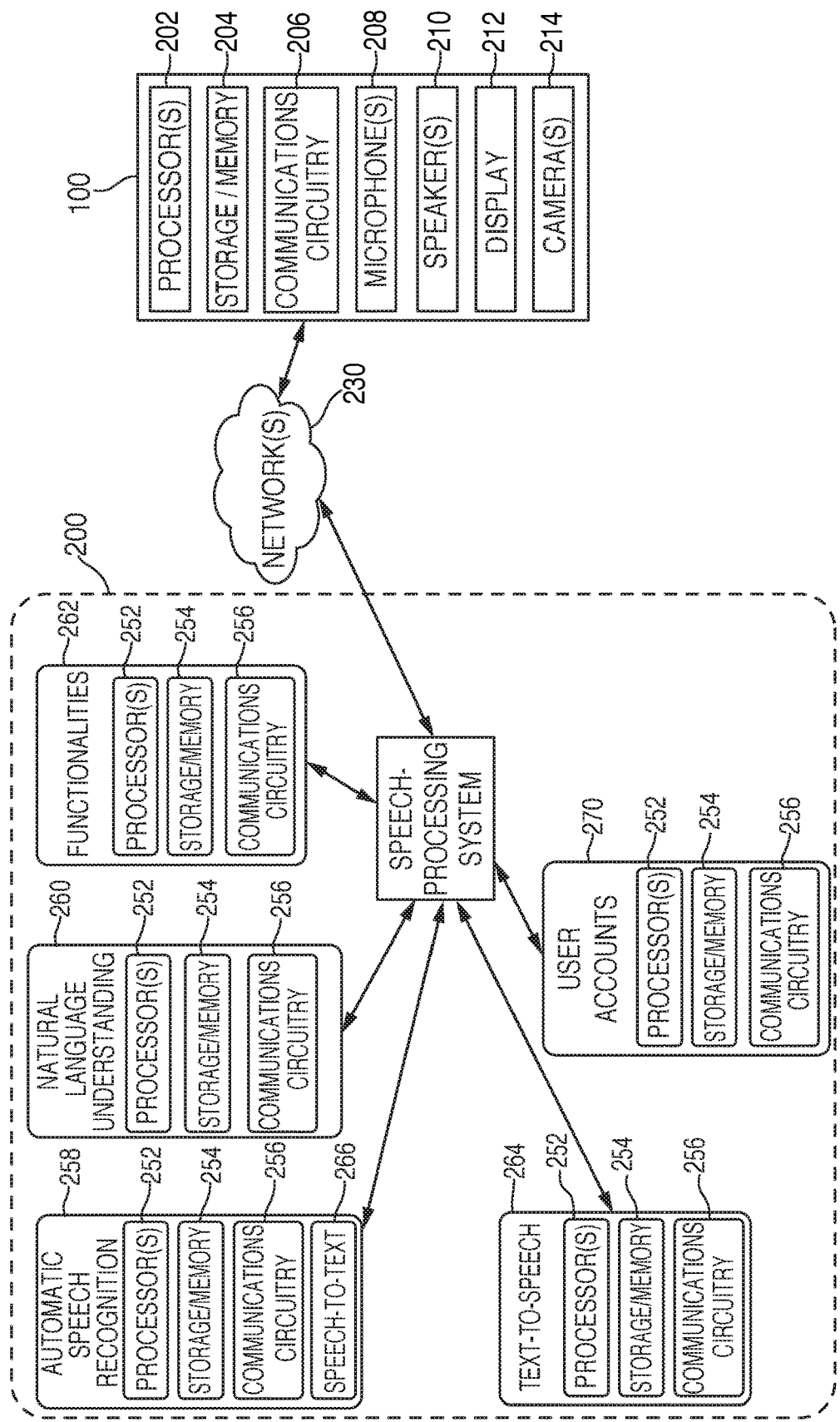
FIG. 2 is an illustrative diagram of a system architecture of the user device of FIG. 1 and a speech-processing system, in accordance with various embodiments.

FIG. 2 is an illustrative diagram of a system architecture of the user device of FIG. 1 and a speech-processing system, in accordance with various embodiments. User device 100 may, in some embodiments, include sound controlled functionality, such as one or more voice or sound activated components. In some embodiments, user device 100 may be configured such that it may communicate with a speech-processing system 200 in response to detecting an utterance including a wakeword, which may subsequently be followed by a request/question/statement. Similarly, user device 100 may alternatively or additionally include one or more manually activated components for manually controlled functionality. In this particular scenario, user device 100 may also be configured, in one embodiment, to communicate with speech-processing system 200 in response to a manual input being detected by one or more input mechanisms, such as a touch screen, a button, and/or a switch, for example.

In a non-limiting embodiment, user device 100 may be capable of being activated in response to detecting a specific sound, such as a wakeword, as well as, or alternatively, via one or more inputs. After detecting a specific sound (e.g., a wakeword or trigger expression), user device 100 may recognize commands (e.g., audible commands, inputs) within captured audio, and may perform one or more actions in response to the received commands. Furthermore, user device 100 may also be configured to perform one or more actions in response to detecting a particular touch, or mechanical, input(s) via user devices 100.

User device 100 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, user device 100 may be relatively simple or basic in structure such that no, or a minimal number of, mechanical input option(s) (e.g., keyboard, mouse, track pad) or touch input(s) (e.g., touch screen, buttons) are included. For example, user device 100 may be able to receive and output audio, and may include power, processing capabilities, storage/memory capabilities, and communication capabilities. However, in other embodiments, user device 100 may include one or more components for receiving mechanical inputs or touch inputs, such as a touch screen and/or one or more buttons.

User device 100, in one embodiment, may include a minimal number of input mechanisms, such as a power on/off switch such that functionality of user device 100 may solely be through audio input and audio output. For example, user device 100 may include, or be in communication with, one or more microphones that listen for a wakeword by continually monitoring local audio. In response to the wakeword being detected, user device 100 may establish a connection with speech-processing system 200, send audio data to speech-processing system 200, and await/receive a response from speech-processing system 200. In some embodiments, however, non-voice/sound activated devices may also communicate with speech-processing system 200 (e.g., push-to-talk devices). For example, in response to a button or touch screen being pressed, or a button or touch screen being pressed and held, a microphone associated with user device 100 may begin recording local audio, and may establish a connection with speech-processing system 200, send audio data representing the captured audio to speech-processing system 200, and await/receive a response from speech-processing system 200.

User device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within user device 100, and/or one or more components may be omitted. For example, user device 100 may also include a power supply or a bus connector. As still yet another example, user device 100 may include one or more additional input and/or output mechanisms, such as one or more buttons, or one or more switches or knobs. Furthermore, while user device 100 may include multiple instances of one or more components, for simplicity only one of each component has been shown.

In some embodiments, user device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, user device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of user device 100 may include one or more microphone(s) 208. These microphone(s) 208 may receive audio input signals, which in turn may be sent to speech-processing system 200 in response to a wakeword engine of user device 100 determining that a wakeword was uttered. Similarly, speaker(s) 210 may be used to output audio data associated with content displayed by user device 100.

Processor(s) 202 may include any suitable processing circuitry capable of controlling operations and functionality of user device 100, as well as facilitating communications between various components within user device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for display devices 102-110, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by user device 100.

Storage/memory 204 may include one or more types of storage mediums such as any volatile or non-volatile memory, or any removable or non-removable memory implemented in any suitable manner to store data for user device 100. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to speech-processing system 200 for processing.

The wakeword database may be a database stored locally by memory of user device 100, and may include a list of a current wakeword for user device 100, as well as one or more previously used, or alternative, wakewords for voice activated electronic device. In some embodiments, an individual may set or program a wakeword for their user device 100. The wakeword may be programmed directly on user device 100, or a wakeword or words may be set by the individual via a local client application that is in communication with speech-processing system 200. For example, an individual may use their mobile device having the speech-processing system application running thereon to set the wakeword. The specific wakeword may then be communicated from the mobile device to speech-processing system 200, which in turn may send/notify user device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on user device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, user device 100 may then begin transmitting the audio signal to speech-processing system 200 for detecting and responds to subsequent utterances made by an individual.

Communications circuitry 206 may include any circuitry allowing or enabling one or more components of user device 100 to communicate with one another, one or more additional devices, servers, and/or systems. For example, communications circuitry 206 may facilitate communications between user device 100 and computing system 200. As an illustrative example, audio data representing an utterance (e.g., utterance 4 of FIG. 1) may be transmitted over a network 230, such as the Internet, to speech-processing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between user device 100 and speech-processing system 200. In some embodiments, user device 100 and speech-processing system 200 may communicate with one another via a web browser using HTTP.

Various additional communication protocols may be used to facilitate communications between user device 100 and speech-processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, user device 100 may include an antenna to facilitate wireless communications with a network using various wireless technologies (e.g., Wi-Fi, Bluetooth, radiofrequency, etc.). In yet another embodiment, user device 100 may include one or more universal serial bus ("USB") ports, one or more Ethernet or broadband ports, and/or any other type of hardwire access port so that communications circuitry 206 allows user device 100 to communicate with one or more communications networks.

User device 100 may also include one or more microphones 208 and/or transducers. Furthermore, user device 100 may include one or more microphones within a separate controller device. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, user device 100 may include multiple microphones (e.g., four, seven, ten, etc.) placed at various positions about user device 100 to monitor/capture any audio outputted in the environment where user device 100 is located. The various microphones 208 may include some microphones optimized for distant sounds, while some microphones may be optimized for sounds occurring within a close range of user device 100. In some embodiments, microphone(s) 208 may only begin to detect audio signals in response to a manual input to user device 100. For example, a manually activated device may begin to capture audio data using microphone(s) 208 in response to a user input, such as pressing a button, tapping a touch screen, or providing any touch input gesture to a touch input component.

User device 100 may include one or more speakers 210. Furthermore, user device 100 may be in communication with one or more speaker(s) 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where user device 100 may be located. In some embodiments, speaker(s) 210 may include headphones or ear buds, which may be wirelessly wired, or hard-wired, to user device 100, that may be capable of broadcasting audio directly to an individual.

In some embodiments, one or more microphones 208 may serve as input devices to receive audio inputs. User device 100, in the previously mentioned embodiment, may then also include one or more speakers 210 to output audible responses. In this manner, user device 100 may function solely through speech or audio, without the use or need for any input mechanisms or displays, however this is merely exemplary.

Display screen 212 may correspond to a display device and/or touch screen, which may be any size and/or shape and may be located at any portion of user device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of user device 100 may be configured to determine which pixels are associated with a particular location point, and which item or items are also displayed at that pixel location. Furthermore, user device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by user device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, user device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, user device 100 may include multiple cameras 214, such as one or more front-facing cameras and/or one or more rear facing cameras. Furthermore, camera(s) 214 may be configured to recognize far-field imagery (e.g., objects located at a large distance away from user device 100) or near-filed imagery (e.g., objected located at a relatively small distance from user device 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be external to user device 100. For instance, an external camera may be capable of capturing images and/or video, which may then be provided to user device 100 for viewing and/or processing.

In one exemplary embodiment, user device 100 may include an additional input/output ("I/O") interface. For example, user device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of user device 100 may include one or more lights, light emitting diodes ("LEDs"), or other visual indicator(s). Persons of ordinary skill in the art will recognize that, in some embodiments, one or more features of the output portion of the I/O interface may be included in a purely voice activated version of user device 100. For example, one or more LED lights may be included on user device 100 such that, when microphone(s) 208 receive audio, the one or more LED lights become illuminated signifying that audio has been received by user device 100. In some embodiments, one or more vibrating mechanisms or other haptic features may be included with user device 100 to provide a haptic response to an individual.

In some embodiments, user device 100 may include radio-frequency identification ("RFID") functionality and/or near field communication ("NFC") functionality. Furthermore, in some embodiments, user device 100 may include one or more infrared ("IR") sensors and one or more IR emitters. The IR sensors/emitters may be used to determine depth information. For example, in one embodiment, a distance of an individual from user device 100 may be determined using the one or more IR sensors/emitters. Depth determination may be performed using any depth determination technique. In some embodiments, a distance between an individual and user device 100 may be employed as a basis for presenting content with varying density using display screen 212. For example, when an individual is at a distance A from user device 100, user device 100 may display weather data for a current day. However as the user moves closer to user device 100, such as at a distance B from user device 100, which may be less than distance A, user device 100 may display weather data for a current week. For instance, as the individual gets closer to user device 100, the ability of the individual to see denser content increases, and as the individual moves father away from user device 100, the individual's ability to see denser content decreases. This, for example, may ensure that the content displayed by user device 100 is continually relevant and readable by the individual.

Speech-processing system 200 may, in some embodiments, include one or more remote devices capable of receiving and sending content from/to one or more electronic device, such as user device 100. Speech-processing system 200 may include various components and modules including, but not limited to, automatic speech recognition ("ASR") module 258, natural language understanding ("NLU") module 260, functionalities module 262, text-to-speech ("TTS") module 264, and user accounts module 268. In some embodiments, speech-processing system 200 may also include computer readable media, including, but not limited to, flash memory, random access memory ("RAM"), and/or read-only memory ("ROM"). Speech-processing system 200 may also include various modules that store software, hardware, logic, instructions, and/or commands for speech-processing system 200, such as a speaker identification ("ID") module, or any other module, or any combination thereof.

ASR module 258 may be configured to recognize human speech in detected audio, such as audio captured by microphone(s) 208, which may then be transmitted to speech-processing system 200. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by speech-processing system 200, such as the expression detector mentioned above with regards to user device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU module 260 may be configured such that it determines user intent based on the received audio data. For example, NLU module 260 may determine that the intent of utterance 4 is for weather information. In response to determining the intent of utterance 4, NLU module 260 may communicate the received command to an appropriate subject matter server or skill on functionalities module 262 to perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

Functionalities module 262 may, for example, correspond to various action specific systems or servers, sometimes referred to as "skills," capable of processing various task specific actions. Functionalities module 262 may further correspond to first party applications and/or third party applications capable of performing various tasks or actions. For example, based on the context of the audio received from user device 100, speech-processing system 200 may use a certain functionality to generate a response, or to obtain response information, which in turn may be communicated back to user device 100. For instance, an utterance may ask for weather information, and therefore functionalities module 262 may access a weather subject matter server to obtain current weather information for a location associated with user device 100. Functionalities module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 270 may store one or more user profiles corresponding to users having a registered account on computing system 200. For example, a parent may have a registered account on computing system 200, and each of the parent's children may have their own user profile registered under the parent's registered account. Information, settings, and/or preferences, for example, for each user profile may be stored within a user profile database. In some embodiments, user accounts module 270 may store a voice signal, such as voice biometric information, for a specific user profile. This may allow speaker identification techniques to be used to match a voice to voice biometric data associated with a specific user profile. In some embodiments, user accounts module 270 may store a telephone number assigned to a particular user profile.

Persons of ordinary skill in the art will recognize that although each of ASR module 258, NLU module 260, subject matter/skills module 262, TTS module 264, and user accounts module 270 may each include instances of processor(s) 252, storage/memory 254, and communications circuitry 256, and those instances of processor(s) 252, storage/memory 254, and communications circuitry 256 within each of ASR module 258, NLU module 260, functionalities module 262, TTS module 264, and user accounts module 270 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

Figure 3:
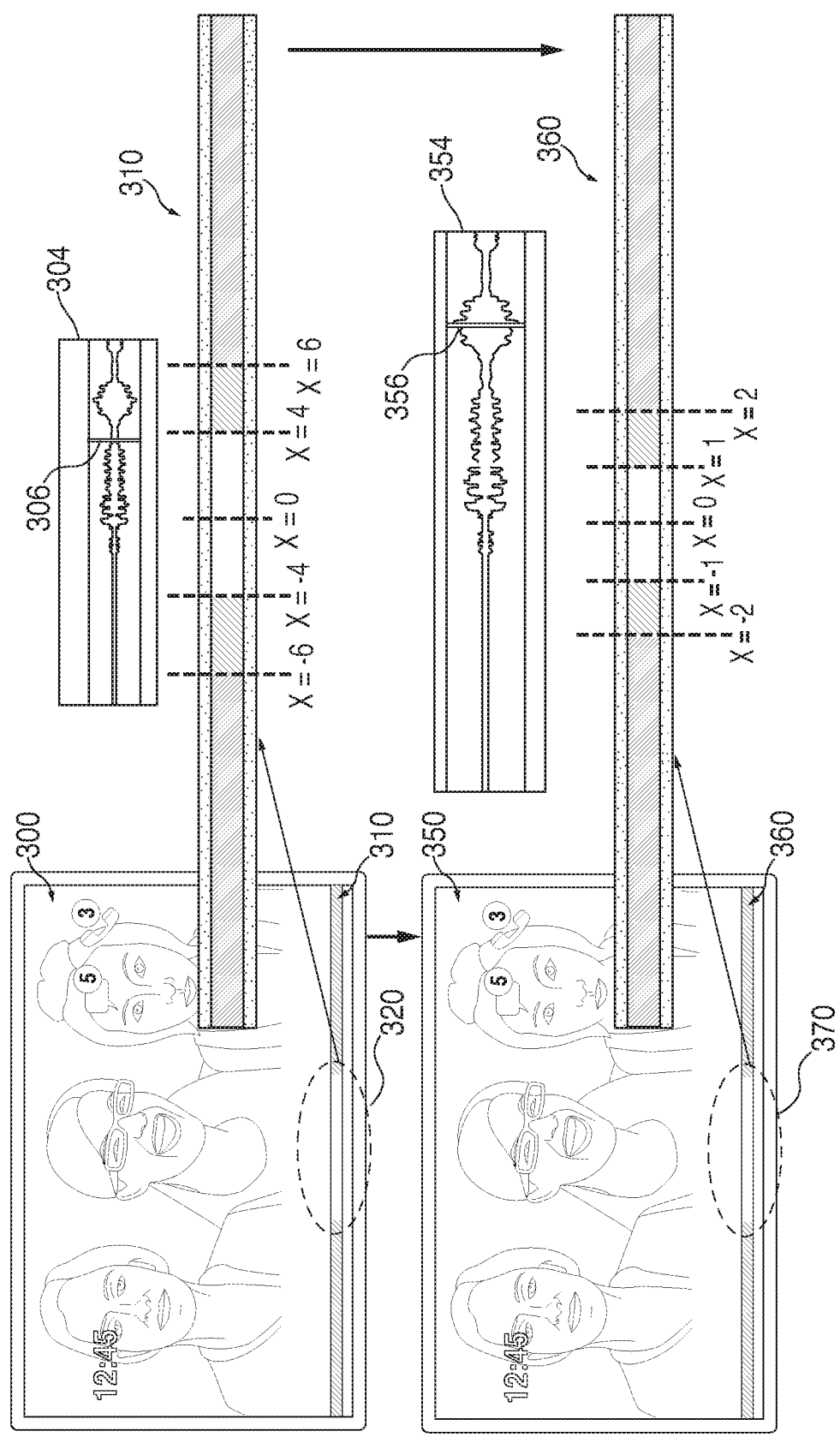
FIG. 3 is an illustrative diagram of exemplary GUIs including audio indicators indicating different volume intensities, in accordance with various embodiments.

FIG. 3 is an illustrative diagram of exemplary GUIs including audio indicators indicating different volume intensities, in accordance with various embodiments. In the exemplary, non-limiting embodiment, a first GUI 300 is displayed on a display screen of a user device, such as display screen 212 of user device 100. For instance, first GUI 300 may be displayed in response to an utterance being spoken that included a wakeword. In response to determining that the wakeword was uttered, user device 100 may begin determining a volume amplitude of each portion of the utterance.

As seen in FIG. 3, waveform 304 includes a digital representation of the audio intensity of exemplary speech. At marker 306, a volume amplitude of the speech, as seen by waveform 304, is substantially small relative to a peak volume amplitude of the speech during that particular temporal period. In some embodiments, the volume amplitude of the speech at marker 306 may correspond to a particular width for main portion 320 of audio indicator 310 displayed by first GUI 304. For example, the volume amplitude at marker 306 may be associated with a first normalized amplitude value, which may be mapped to a first width for main portion 320. For instance, the first width may correspond to X=10, such that main portion 320 is centered about origin point X=0, and extends horizontally to the left and right by an amount X=5 (e.g., {-5, 5}). Persons of ordinary skill in the art will also recognize that the first width may alternatively correspond to a percentage of audio indicator 310 which may be displayed in a particular format, such as in a particular color, size, and/or shape. For instance, a first width of X=10 may be associated with 50% of a total width of audio indicator 310. If display screen 212, which may be displaying first GUI 300, has a resolution of 1024 pixels in width by 768 pixels in height, then the first width may correspond to approximately 512 pixels, and therefore main portion 320 may have a width of approximately 512 pixels.

In the illustrative embodiment, main portion 320 may, itself, be segmented into two portions: a first main portion having the first width (e.g., 512 pixels in width), and a second main portion having a second width. For example, the second main portion may have a width of X=4. As an illustrative example, the second width may correspond to approximately 20% of the total width of audio indicator 310. Continuing the aforementioned example, this may correspond to the second portion having a width of approximately 204 pixels. In this particular instance, the second main portion may be of a slightly different color, size, and/or shape as compared to the first main portion such that the first main portion and the second main portion are visually distinguishable from non-main portions of audio indicator 310 (e.g., which may be a graphical beam including at least one main portion and at least two non-main portions), however persons of ordinary skill in the art will recognize that this is merely exemplary.

User device 100 may continue to analyze the audio data representing the spoken utterance, such as utterance 4, and may generate new display data representing a second GUI 350 including a second audio indicator 360. In the illustrative embodiment, second waveform 354 includes marker 356, corresponding to a different volume amplitude of the speech. For instance, marker 306 may correspond to utterance 4 at a time $t_1$, and marker 356 may correspond to utterance 4 at a time $t_2$, where $t_2$ is later than $t_1$. In the illustrative embodiment, at marker 356, the volume amplitude may be greater than the volume amplitude as seen at marker 306. This, for instance, may indicate that the volume of utterance 4 is louder at time $t_2$ than at time $t_1$.

When user device 100 normalizes the volume amplitude at time $t_2$, a second normalized volume amplitude value may be determined. For example, the second normalized amplitude may be larger than the first normalized volume amplitude associated with marker 306 at time $t_1$. As an illustrative example, the first normalized volume amplitude value at marker 306 may be 0.1, whereas the second normalized volume amplitude value at marker 356 may be 0.6, corresponding to the volume of utterance 4 being louder at time $t_2$ than at time $t_1$.

In some embodiments, user device 100 may then map the second normalized volume amplitude to a width of main portion 370 of audio indicator 360. In the illustrative embodiment, the width of main portion 370 may be smaller than that of main portion 320 for audio indicator 310. For instance, user device 100 may be configured such that larger normalized amplitude values map to smaller widths for main portions of a corresponding audio indicator. As an illustrative example, the width of main portion 370 may be X=4, with an origin at X=0 (e.g., {-2, 2}). The display data representing second GUI 350 may be generated such that audio indicator 360 is displayed having a smaller width for main portion 370 than was displayed for main portion 320, providing the appearance that the main portion of the audio indicator, displayed by the GUI, contracts as the volume of the speech increases. For instance, a width of X=4 may be associated with 20% of a total width of audio indicator 360. If display screen 212, which may be displaying second GUI 350, has a resolution of 1024 pixels in width by 768 pixels in height, than this width may correspond to approximately 200 pixels, and therefore main portion 370 may have a width of approximately 200 pixels.

Furthermore, in one embodiment, as mentioned previously, main portion 370 may be segmented into multiple portions, such as: a first main portion having the first width, and a second main portion having a second width such that the first main portion and the second main portion are visually distinguishable from non-main portions of audio indicator 360 (e.g., which may be a graphical beam including at least one main portion and at least two non-main portions). For example, the second main portion may now have a width of X=2. In this particular scenario, the second main portion may be of a slightly different color, size, and/or shape as compared to the first main portion, however persons of ordinary skill in the art will recognize that this is merely exemplary. As an illustrative example, a width of X=2 may be associated with 10% of a total width of audio indicator 360. Continuing the aforementioned example, this may correspond to the second portion having a width of approximately 102 pixels. This may further provide the appearance that the audio indicator is focusing in on the speech to better provide an individual with the visual representation that the audio indicator is reflective of the perceived sound, as would be heard by the human brain.

Figure 4:
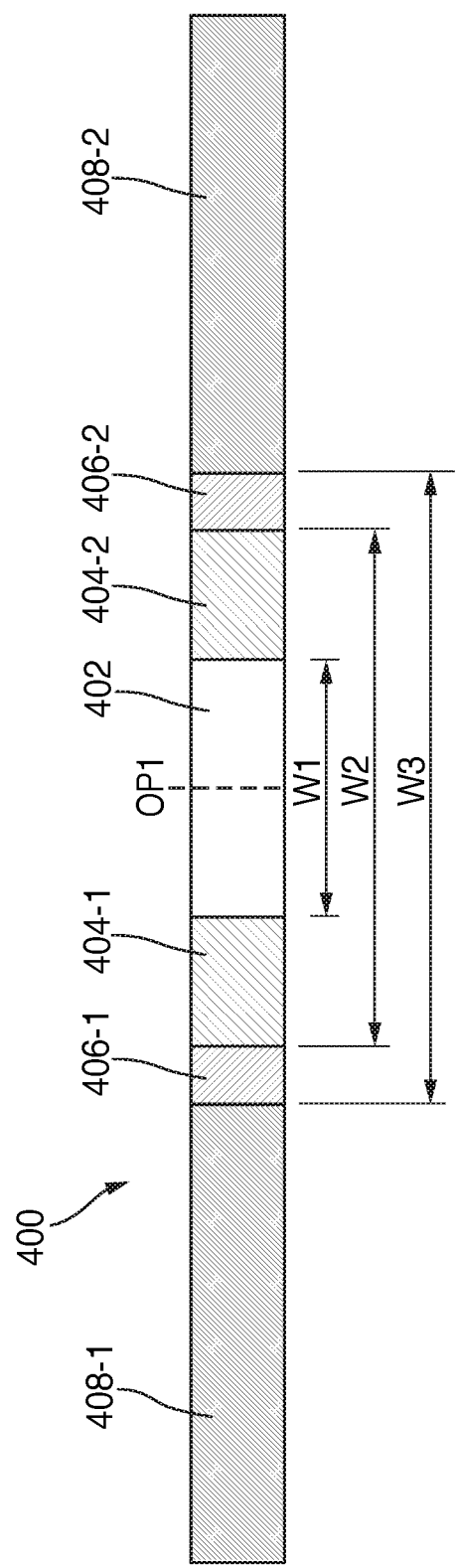
FIG. 4 is an illustrative diagram of an exemplary audio indicator, in accordance with various embodiments.

FIG. 4 is an illustrative diagram of an exemplary audio indicator, in accordance with various embodiments. In the non-limiting embodiment, an audio indicator 400 may be included within a displayed GUI, displayed on display screen 212 of user device 100. For example, audio indicator 400 may be displayed in response to an utterance being spoken. Audio indicator 400 may be displayed such that it provides an individual (e.g., individual 2) with a visual representation of the perceived loudness of the utterance that he/she spoke (e.g., a volume of utterance 4).

In some embodiments, audio indicator 400 may be segmented into multiple portions. For instance, an audio indicator segmented into at least three portions may correspond to a graphical beam, in one embodiment. A graphical beam, as described herein, may correspond to a type of audio indicator including at least one main portion and at least two non-main portions. For example, audio indicator 400 may include a main portion 402, which may be centered about a particular origin point, such as OP1. In the exemplary embodiment, OP1 is located at a horizontal midpoint along audio indicator 400, however this is merely illustrative. For instance, there may be multiple origin points located along a horizontal length of audio indicator 400 which main portion 402 may be centered about.

In some embodiments, main portion 402 may be of a first color, shading, gradient, texture, and/or prominence. For example, main portion 402 may be a light blue color. Alternatively, or additionally, main portion 402 may be of a first height, which may be larger or smaller than other portions of audio indicator 400. Main portion 402 may also be displayed having one or more effects, such as an effect to make main portion 402 as if it were glowing, pulsing, shaking, or any other suitable effect, or any combination thereof.

A first width W1 of main portion 402 may correspond to a normalized amplitude value determined by user device 100. For instance, as described previously, the louder a particular phoneme from an utterance (e.g., utterance 4) is spoken during a particular temporal interval, the louder the amplitude of the audio signal received by microphone(s) 208 of user device 100. The amplitude value for the temporal interval may then be normalized relative to a maximum threshold amplitude value and a minimum threshold amplitude value that may be preconfigured by user device 100. For example, user device 100 may be manufactured such that the maximum threshold amplitude value and the minimum threshold amplitude values are stored within storage/memory 204. As another example, user device 100 may be capable of dynamically changing the maximum/minimum threshold amplitude values based on voice biometric information, as well as, or alternatively, the different volume amplitude levels detected by microphone(s) 208 during the course of a large temporal duration (e.g., days, weeks, months, etc.). Still further, speech-processing system 200 may provide updated maximum/minimum threshold amplitude values to user device 100 based on offline analysis performed.

The normalized amplitude value may then be mapped to a corresponding width for main portion 402. In some embodiments, the larger the normalized amplitude value, the smaller first width W1 of main portion 402 will be, however this is merely exemplary. For instance, the larger the normalized amplitude value, the larger first width W1 may be. Further still, a larger normalized amplitude value may, alternatively, correspond to a larger or smaller height of main portion 402, where, in this particular instance, first width W1 may remain fixed.

User device 100 may store mapping information within storage/memory 204 that indicates a particular width W1 associated with a particular normalized amplitude value. In some embodiments, the mapping may be in terms of percentage. For example, a normalized amplitude value of 1.0 may correspond first width W1 being equal to a number of pixels that display screen 212 has as its width (e.g., if there are 1024 pixels in width, then a normalized amplitude value of 1.0 would mean that first width W1 corresponds to 1024 pixels in width).

Audio indicator 400, in one embodiment, may also include second portions 404-1 and 404-2, which may be located horizontally proximate to either side of main portion 402. Second portions 404-1 and 404-2 may be of a second color, shading, gradient, texture, and/or prominence. For example, second portions 404-1 and 404-2 may be a darker blue color. Alternatively, or additionally, second portions 404-1 and 404-2 may be of a second height, which may be larger or smaller than other portions of audio indicator 400, such as main portion 402. Second portions 404-1 and 404-2 may also be displayed having one or more effects, such as an effect to make second portions 404-1 and 404-2 appear as if it were glowing, pulsing, shaking, or any other suitable effect, or any combination thereof.

In some embodiments, second portions 404-1 and 404-2 may extend a first distance away from origin point OP1. For example, a width of main portion 402 and second portions 404-1, 404-2 may be second width W2, where a width of the displayed second portions 404-1 and 404-2 may be equal to half of W2 minus W1. User device 100 may also store mapping information within storage/memory 204 that indicates a particular width W2 associated with a particular normalized amplitude value. In some embodiments, the mapping may be in terms of percentage, as described above. For example, a normalized amplitude value of 1.0 may correspond first width W2 being equal to a number of pixels that display screen 212 has as its width, minus the number of pixels associated with first width W2. As an illustrative example, if there are 1024 pixels in width, then a normalized amplitude value of 1.0 would mean that second width W2 corresponds to 0 pixels, as first width W1 corresponds to 1024 pixels in width.

In some embodiments, second portions 404-1 and 404-2 may be associated with a certain percentage of the width of first portion 402. For instance, second portions 404-1 and 404-2 may be configured to be 50% of the width of first portion 402. As an illustrative example, if first width W1 is 400 pixels, then second portions 404-1 and 404-2 may be 200 pixels in width, each. Persons of ordinary skill in the art will recognize that second portions 404-1 and 404-2 may be associated with any particular percentage or amount of the width of first portion 402, and the aforementioned is merely exemplary. Furthermore, user device 100 may store preconfigured mapping values for second portions 404-1 and 404-2 based on the determined normalized amplitude value. For instance, for a normalized amplitude value of 0.5, first portion 402 may be set as being equal to 30% of the pixel width of display screen 212, while second portions 404-1 and 404-2 may be set as being 10% of the pixel width of display screen 212, however these values are merely exemplary. Furthermore, first portion 402 may displayed to be of the first width such that it is visually distinguishable from at least second portions 404-1 and 404-2 (e.g., the first width of first portion 402 is larger or smaller than a width of second portions 404-1, 404-2).

Audio indicator 400, in one embodiment, may also include third portions 406-1 and 406-2, which may be located horizontally proximate to second portions 404-1 and 404-2, respectively. Third portions 406-1 and 406-2 may be of a third color, shading, gradient, texture, and/or prominence. For example, third portions 406-1 and 406-2 may be a dark blue color, as compared to first portion 402. Alternatively, or additionally, third portions 406-1 and 406-2 may be of a third height, which may be larger or smaller than other portions of audio indicator 400, such as main portion 402 and second portions 404-1, 404-2. Third portions 406-1 and 406-2 may also be displayed having one or more effects, such as an effect to make third portions 406-1 and 406-2 appear as if it were glowing, pulsing, shaking, or any other suitable effect, or any combination thereof.

In some embodiments, third portions 406-1 and 406-2 may extend a second distance away from origin point OP1. For example, a width of main portion 402, second portions 404-1, 404-2, and third portions 406-1, 406-2 may, in total, be third width W3, where a width of the displayed third portions 406-1 and 406-2 may be equal to half of W3 minus W2.

In some embodiments, third portions 406-1 and 406-2 may be associated with a certain percentage of the width of first portion 402. For instance, third portions 406-1 and 406-2 may be configured to be 20% of the width of first portion 402. As an illustrative example, if first width W1 is 400 pixels, then third portions 406-1 and 406-2 may be 80 pixels in width, each. Persons of ordinary skill in the art will recognize that third portions 406-1 and 406-2 may be associated with any particular percentage or amount of the width of first portion 402 and/or second portions 404-1 and 404-2, and the aforementioned is merely exemplary. Furthermore, user device 100 may store preconfigured mapping values for third portions 406-1 and 406-2 based on the determined normalized amplitude value. For instance, for a normalized amplitude value of 0.5, first portion 402 may be set as being equal to 30% of the pixel width of display screen 212, while second portions 404-1 and 404-2 may be set as being 20% of the pixel width of display screen 212, and third portions 406-1 and 406-2 may be set as being 10% of the pixel width of display screen 212, however these values are merely exemplary.

Audio indicator 400, in one embodiment, may also include fourth portions 408-1 and 408-2, which may be located horizontally proximate to third portions 406-1 and 406-2, respectively. Fourth portions 408-1 and 408-2 may be of a fourth color, shading, gradient, texture, and/or prominence. For example, fourth portions 408-1 and 408-2 may a purple color. Alternatively, or additionally, fourth portions 408-1 and 408-2 may be of a fourth height, which may be larger or smaller than other portions of audio indicator 400, such as first portion 402, second portions 404-1, 404-2, and third portions 406-1, 406-2. Fourth portions 408-1 and 408-2 may also be displayed having one or more effects, such as an effect to make fourth portions 408-1 and 408-2 appear as if it were glowing, pulsing, shaking, or any other suitable effect, or any combination thereof.

In some embodiments, fourth portions 408-1 and 408-2 may extend in from an outer horizontal edge of audio indicator 400, to an outer edge of third portions 406-1 and 406-2, respectively. For example, if audio indicator 400 has a length L along a horizontal axis, then fourth portions 408-1 and 408-2 may be equal to half of length L minus W3.

In some embodiments, fourth portions 408-1 and 408-2 may be associated with a certain percentage of the width of first portion 402. For instance, fourth portions 408-1 and 408-2 may be configured to be 5% of the width of first portion 402. As an illustrative example, if first width W1 is 400 pixels, then fourth portions 408-1 and 408-2 may be 20 pixels in width, each. Persons of ordinary skill in the art will recognize that fourth portions 408-1 and 408-2 may be associated with any particular percentage or amount of the width of first portion 402, second portions 404-1, 404-2, and/or third portions 406-1, 406-2, and the aforementioned is merely exemplary. Furthermore, user device 100 may store preconfigured mapping values for fourth portions 408-1 and 408-2 based on the determined normalized amplitude value. For instance, for a normalized amplitude value of 0.5, first portion 402 may be set as being equal to 30% of the pixel width of display screen 212, while second portions 404-1 and 404-2 may be set as being 20% of the pixel width of display screen 212, third portions 406-1 and 406-2 may be set as being 10% of the pixel width of display screen 212, and fourth portions 408-1 and 408-2 may be set as being 5% of the pixel width of display screen 212, however these values are merely exemplary.

Although in the illustrative embodiment audio indicator 400 is represented as a horizontal bar that may extend across a GUI displayed on a display screen, persons of ordinary skill in the art will recognize that this is merely exemplary. For instance, audio indicator 400 may be any suitable shape, and may also be of any suitable size. As an illustrative example, audio indicator 400 may be substantially circular, where main portion 402 may be located at any suitable position along the circle. For instance, if audio indicator 400 is circular, main portion 402 may be centered about 0-degrees, 90-degrees, 180-degrees, 270-degrees, and the like. Similarly, second portions 404-1, 404-2 may be located on either side of main portion 402; third portions 406-1, 406-2 may be located on either side of second portions 404-1, 404-2; and fourth portions 408-1, 408-2 may occupy a remaining portion of audio indicator 400. Still further, persons of ordinary skill in the art will recognize that audio indicator 400 may be segmented into any suitable number of portions, and the use of one main portion with three additional portions on either side occupying a remaining, or substantially the remaining, amount of the area of audio indicator 400 is merely exemplary.

Still further, audio indicator 400 may be positioned at different vertical heights about display screen 212 based on a particular device type of user device 100. For example, for some device types, such as voice activated electronic device including a display screen, audio indicator 400 may be positioned at a vertical center of the display screen (e.g., for a 1024 pixel by 768 pixel display screen, the vertical center would correspond to a vertical position along the 384 pixel height). As other examples, audio indicator 400 may be positioned at a vertical bottom of the display screen (e.g., a vertical position along 0 pixel height), towards a top of the display screen (e.g., a vertical position along approximately 700 pixel height), towards a bottom of the display screen (e.g., a vertical position along approximately 100 pixel height), or at any other suitable position.

Figure 5:
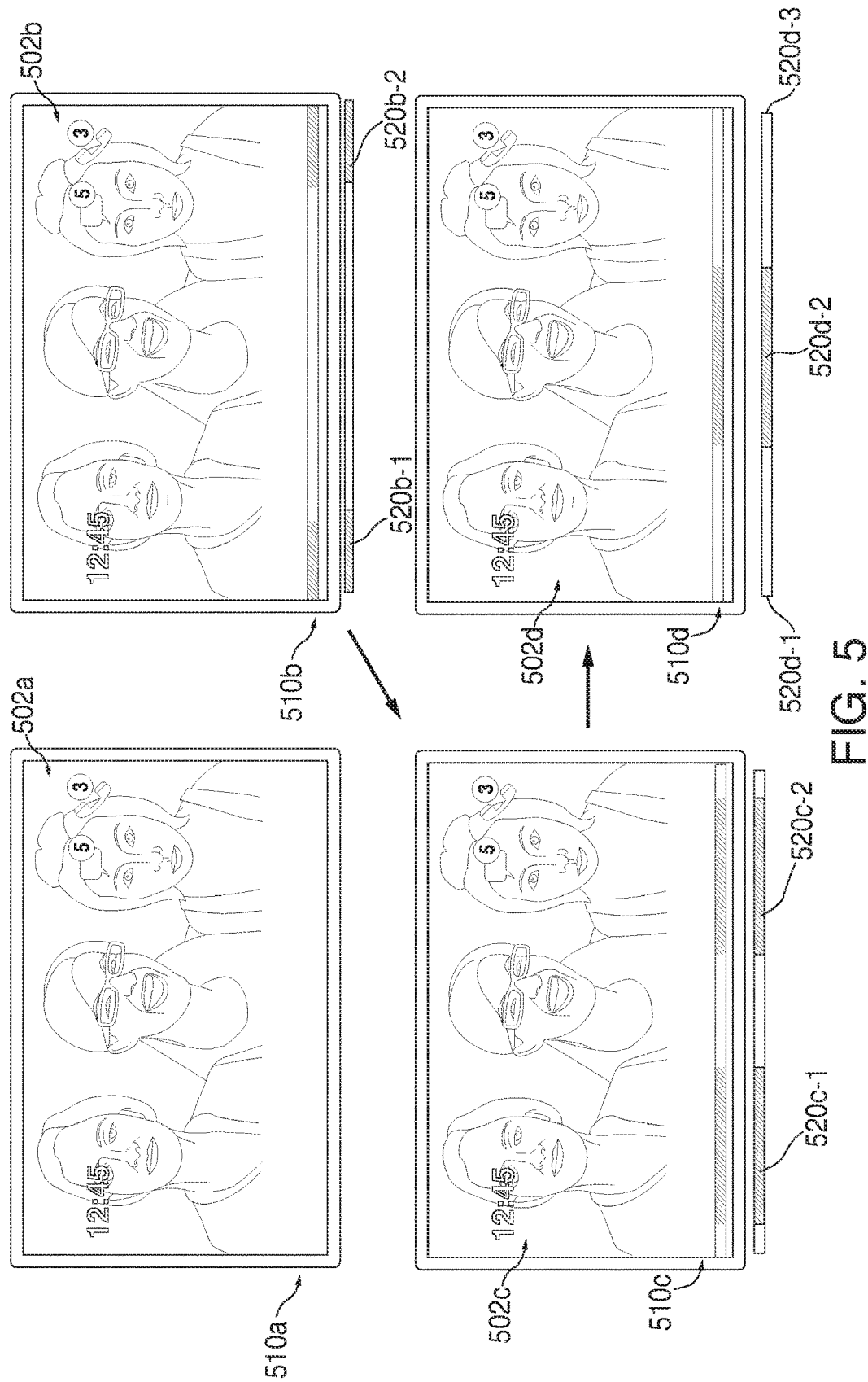
FIG. 5 is an illustrative diagram of exemplary GUIs including audio indicators representative of a user device detecting a particular trigger expression, in accordance with various embodiments.

FIG. 5 is an illustrative diagram of exemplary GUIs including audio indicators representative of a user device detecting a particular trigger expression, in accordance with various embodiments. In a non-limiting embodiment, user device 100 may include keyword spotting technology, as mentioned previously. In response to a particular trigger expression, such as a wakeword, phrase, or sound, being determined to have occurred within audio data representing an utterance, user device 100 may cause one or more animations/visualizations to be displayed. Similarly, in response to determining that a manual activation feature has been invoked, user device 100 may also be capable of causing one or more animations/visualizations to be displayed.

User device 100 may initially display a first GUI 502*a* using display screen 212. For instance, first GUI 502*a* may correspond to a "home screen," or "standby display." In one embodiment, blank space 510*a* may indicate a region of first GUI 502*a* where an audio indicator, if it were being displayed, would be. However, first GUI 502*a*, in the exemplary embodiment, may not include an audio indicator displayed thereon prior to determining that the trigger expression has been uttered, or that a manual trigger has occurred (e.g., a button being pressed). In response to determining that the trigger expression has been uttered (e.g., "Alexa, . . . "), user device 100 may include means for causing a particular animation/visualization to be displayed by display screen 212. For example, an audio indicator may be displayed on display screen 212 that allows an individual to visually see the apparent loudness and intonation of their spoken words. One exemplary animation/visualization may be illustrated by GUIs 502*b-d*, as described in greater detail below.

After determining that the trigger expression (e.g., "Alexa") has been uttered or the manual trigger has being performed, first audio indicator 510*b* may be displayed within second GUI 502*b*. Second GUI 502*b* may be substantially similar to first GUI 502*a*, with the exception that second GUI 502*b* may include audio indicator 510*b*. Second audio indicator 510*b* may correspond to a first portion of an animation sequence that is displayed after user device 100 detects a wakeword, or a manual activation mechanism is invoked. In the first portion of the animation, a first bar 520*b*-1 and a second bar 520*b*-2 may be displayed at either end of second audio indicator 510*b*. Each of first and second bars 520*b*-1, 520*b*-2 may be of a first size (e.g., height, width). For example, first and second bars 520*b*-1, 520*b*-2 may have a width that is approximately 10% of a total width of audio indicator 510*b* (e.g., a width of second GUI 502*b*). However persons of ordinary skill in the art will recognize that this is merely exemplary.

The animation process may continue with third GUI 502*c*, which may be substantially similar to second GUI 502*b*, with the exception that third GUI 502*c* may include audio indicator 510*c*. In the illustrative embodiment, third audio indicator 510*c* may correspond to a second portion of the animation sequence described previously. In the second portion, a first bar 520*c*-1 and a second bar 520*c*-2 are displayed along a horizontal axis of audio indicator 510*c*. In one embodiment, first and second bars 520*c*-1 and 520*c*-2 may be of a second size. For example, first and second bars 520*c*-1 and 520*c*-2 may have a width that is approximately 20% of the total width of audio indicator 510*c* (e.g., a width of third GUI 502*c*). Furthermore, each of bars 520*c*-1 and 520*c*-2 may be centered at a midpoint between each edge of audio indicator 510*c* and a center of audio indicator 510*c*.

The animation process may then continue with fourth GUI 502*d*, which may be substantially similar to third GUI 502*c*, with the exception that fourth GUI 502*d* may correspond to a third portion of the animation sequence. In the third portion, a first portion 520*d*-1, a second portion 520*d*-2, and a third portion 520*d*-3 are displayed along a horizontal axis of audio indicator 510*d*. Second portion 520*d*-2, in one embodiment, may correspond to a convolution of first and second bars 520*c*-1 and 520*c*-2 of third GUI 502*c*, and first and third portions 520*d*-1 and 520*d*-3 may correspond to end portions of audio indicator 510*d*.

The animation sequence described by GUIs 502*a*-*d* describe, for instance, an exemplary visualization for the audio indicators where, in response to detecting the wakeword's utterance, an audio indicator appears on the display screen that draws focus from the edges of the display screen to the center of the display screen. The resulting audio indicator (e.g., audio indicator 510*d*), in one embodiment, may be substantially similar to audio indicator 400 of FIG. 4, with the exception that few portions are displayed within the latter. In sequence, first and second bars of GUIs 520*b*-*d* will be displayed such that they provide the appearance as if they are moving inwards from the edges of the display screen until they meet in the center and merge into a single main portion of the audio indicator. The outer portions of the audio indicator, therefore, then may differentiate themselves from the main portion by having a different color, shape, size, etc.

Figure 6:
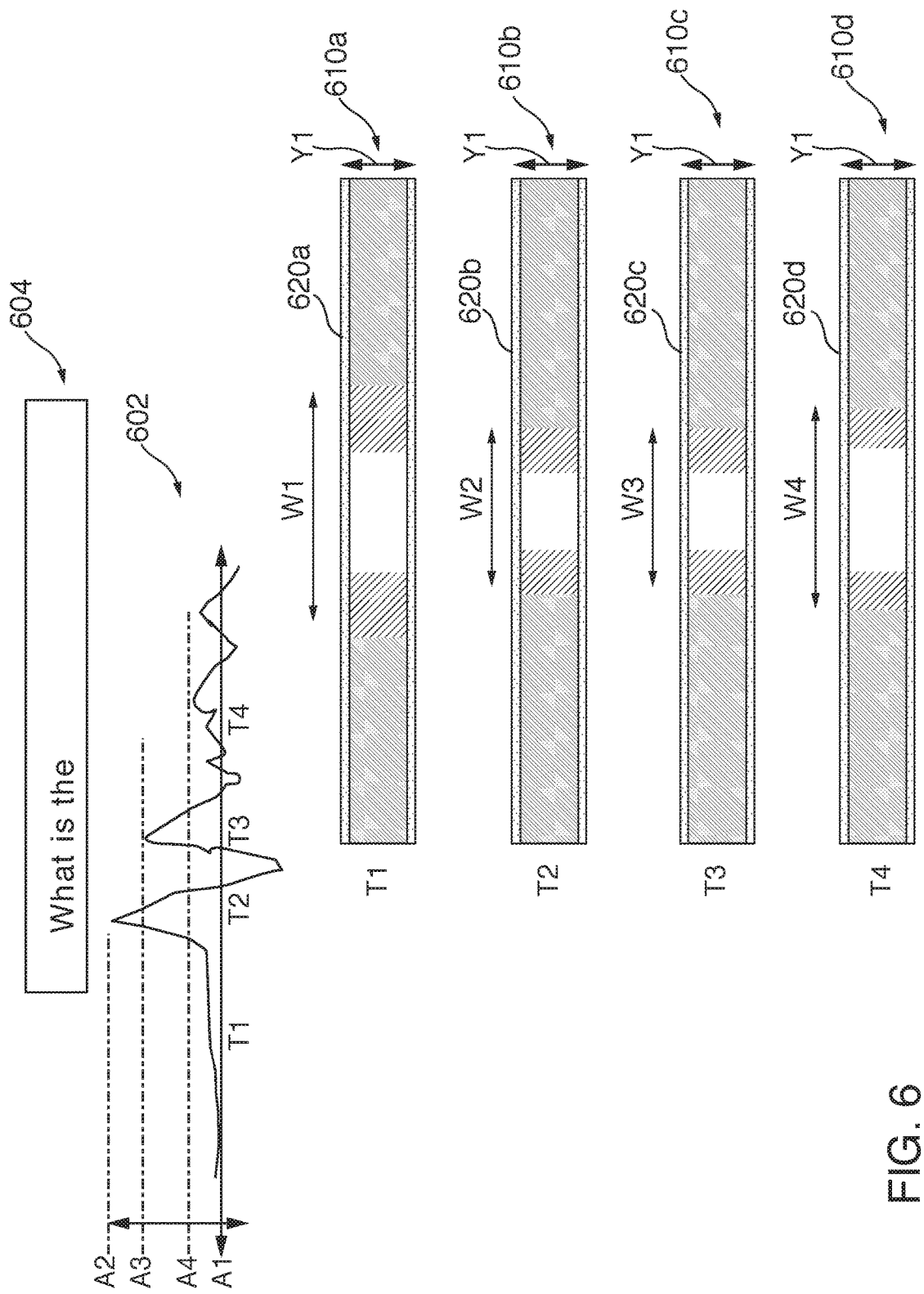
FIG. 6 is an illustrative diagram of exemplary audio indicators having different sizes based on different volume intensities, in accordance with various embodiments.

FIG. 6 is an illustrative diagram of exemplary audio indicators having different sizes based on different volume intensities, in accordance with various embodiments. In FIG. 6, an exemplary waveform 602 is displayed, which may represent an illustrative breakdown of the words spoken within utterance 604. For instance, the word "What" is the first word from utterance 4 of FIG. 1, the second word is "is," and the third word is "the" (e.g., "What is the weather like?"). Each of the words "What," "is," and "the" correspond to a single phoneme as perceived by the human brain when hearing those words.

When user device 100 received audio data representing utterance 4, the audio data may be analyzed in discrete temporal intervals, T1, T2, T3, and T4, for example. Each temporal interval may include a certain number of volume amplitude data points, which are based on the sampling rate of microphones 208 of user device 100. As each temporal interval of the audio data is received, an RMS filtering function may be applied to that portion of the audio data to determine an RMS amplitude associated with each temporal interval. The various RMS amplitudes may then be normalized based on preconfigured maximum and/or minimum threshold amplitude values, stored by user device 100. Based on the normalized amplitude value for each temporal interval, user device 100 may map a particular normalized amplitude value to a particular width for a main portion of an audio indicator, to visually represent the perceived phonetic loudness of the spoken utterance over time.

During temporal interval T1, prior to the word "What" being spoken, the volume amplitude data may be received by user device 100, and the RMS filtering function may be applied thereto. The RMS amplitude, therefore, of utterance 604 during temporal interval T1 may be represented by first RMS volume amplitude A1. For example, prior to the first word of the utterance being spoken, the volume of the audio data may be substantially small, such sound having little to no sound may be received by microphone(s) 208 of user device 100. The first word, "What," which is spoken during temporal interval T2, may have second volume amplitude data that, in response to having the RMS filtering function applied thereto, may yield a second RMS volume amplitude A2, which may be larger than first volume amplitude A1, corresponding to temporal interval T2.

During temporal interval T3, the word "is" may be spoken, corresponding to a second phoneme as perceived by the human brain when heard, and volume amplitude data representing that portion of utterance 604 may be received by user device 100. The RMS filtering function may be applied to the volume amplitude data and a third RMS volume amplitude A3 may be determined, corresponding to temporal interval T3. In the illustrative embodiment, third RMS volume amplitude A3 may be greater than first RMS volume amplitude A1, but less than second RMS volume amplitude A2. During temporal interval T4, the word "the" may be spoken, corresponding to a third phoneme as perceived by the human brain when heard, and volume amplitude data representing that portion of utterance 604 may be received by user device 100. The RMS filtering function may be applied to the volume amplitude data, and a fourth RMS volume amplitude A4 may be determined, corresponding to temporal interval T4. Fourth RMS volume amplitude A4, in one embodiment, may be less than third RMS volume amplitude A3, but greater than first RMS volume amplitude A1. Therefore, in the illustrative embodiment, the volume of utterance 604 starts off at a first loudness during temporal interval T1, increasing during temporal interval T2, and then gradually decreasing during temporal intervals T3 and T4.

The maximum and minimum threshold volume amplitudes, which may be stored by user device 100, may then be used to normalize each of the RMS volume amplitudes (e.g., A1-A4) to generate normalized amplitude values ranging between 0 and 1. As an illustrative embodiment, first RMS volume amplitude A1 may result in a normalized amplitude value of 0.1, second RMS volume amplitude A2 may result in a normalized amplitude value of 0.7, third RMS volume amplitude A3 may result in a normalized amplitude value of 0.5, and fourth RMS volume amplitude A4 may result in a normalized amplitude value of 0.3. User device 100 may then map the normalized amplitude volumes to a particular width of a main portion of an audio indicator, to visually represent the perceived loudness during each temporal interval, corresponding, for example, to each phoneme, of utterance 604.

In some embodiments, user device 100 may employ a reverse mapping, where larger normalized amplitude values are associated with smaller widths for the main portion of the corresponding audio indicator, and smaller normalized amplitude values are associated with larger widths for the main portion of the corresponding audio indicator. This is seen, for example, and without limitation, by exemplary audio indicators 610*a*-*d*.

First audio indicator 610*a* may, in one embodiment, correspond to temporal interval T1, just prior to the first word "What" is uttered. During temporal interval T1, the RMS volume amplitude may be A1. Using the aforementioned illustrative example, first RMS volume amplitude A1 may have a normalized volume amplitude value of 0.1, which may be associated with a width W1 for main portion 620*a* of audio indicator 610*a*. In some embodiments, width W1 may correspond to a certain percentage of audio indicator 610*a*. For example, width W1 may correspond to 50% of the overall width of audio indicator 610*a*. Therefore, if user device 100 has a display screen having 1024 pixels in width (e.g., along a horizontal axis), then width W1 would be approximately 512 pixels in width.

Second audio indicator 610*b* may, in one embodiment, correspond to temporal interval T2, when the first word "What" is uttered. During temporal interval T2, the RMS volume amplitude may be A2. Using the aforementioned illustrative example, second RMS volume amplitude A2 may have a normalized volume amplitude value of 0.7, which may be associated with a width W2 for main portion 620*b* of audio indicator 610*b*. In some embodiments, width W2 may correspond to a certain percentage of audio indicator 610*b*. For example, width W2 may correspond to 10% of the overall width of audio indicator 610*b*. Therefore, if user device 100 has a display screen having 1024 pixels in width (e.g., along a horizontal axis), width W2 would be approximately 102 pixels in width.

Third audio indicator 610*c* may, in one embodiment, correspond to temporal interval T3, when the second word "is" is uttered. During temporal interval T2, the RMS volume amplitude may be A3. Using the aforementioned illustrative example, third RMS volume amplitude A3 may have a normalized volume amplitude value of 0.5, which may be associated with a width W3 for main portion 620*c* of audio indicator 610*c*. In some embodiments, width W3 may correspond to a certain percentage of audio indicator 610*c*. For example, width W3 may correspond to 20% of the overall width of audio indicator 610*c*. Therefore, if user device 100 has a display screen having 1024 pixels in width (e.g., along a horizontal axis), width W3 would be approximately 204 pixels in width.

Fourth audio indicator 610*d* may, in one embodiment, correspond to temporal interval T4, when the third word "the" is uttered. During temporal interval T4, the RMS volume amplitude may be A4. Using the aforementioned illustrative example, fourth RMS volume amplitude A4 may have a normalized volume amplitude value of 0.3, which may be associated with a width W4 for main portion 620*d* of audio indicator 610*d*. In some embodiments, width W4 may correspond to a certain percentage of audio indicator 610*d*. For example, width W4 may correspond to 30% of the overall width of audio indicator 610*d*. Therefore, if user device 100 has a display screen having 1024 pixels in width (e.g., along a horizontal axis), width W4 would be approximately 306 pixels in width.

Therefore, taking audio indicators 610*a-d* in sequence, the width of main portions 620*a-d* will start at a first width W1, associated a smallest RMS volume amplitude, and then decrease to second width W2, associated with the largest RMS volume amplitude. Afterwards, main portion 620*c* and 620*d* gradually increase in width, from width W3 to width W4 as the RMS volume amplitudes decrease from A3 to A4. Thus, in the illustrative embodiment, the main portion of the audio indicator (e.g., main portions 620*a-d*) may appear to narrow as the volume of the utterance increases. Furthermore, main portions 620*a-d* may, in the illustrative embodiments, appear to be visually distinguishable from the other portions of the audio indicator.

Furthermore, audio indicator 610*a* may also have a first height Y1. In some embodiments, the height of audio indicator 610*a* may be independent on the volume of during each temporal interval. For example, audio indicators 610*b*, 610*c*, and 610*d* may each be first height Y1. In some embodiments, first height may be preconfigured for each audio indicator by user device 100. For example, first height Y1 may be 10% of the height of the display screen. Therefore, if the display screen is 768 pixels in height (e.g., along a vertical axis), then height Y1 would be approximately 76 pixels. However, in some embodiments, as described below, the height of the audio indicators may change based on, amongst other factors, and without limitation, a proximity of an individual to user device 100.

Figure 7:
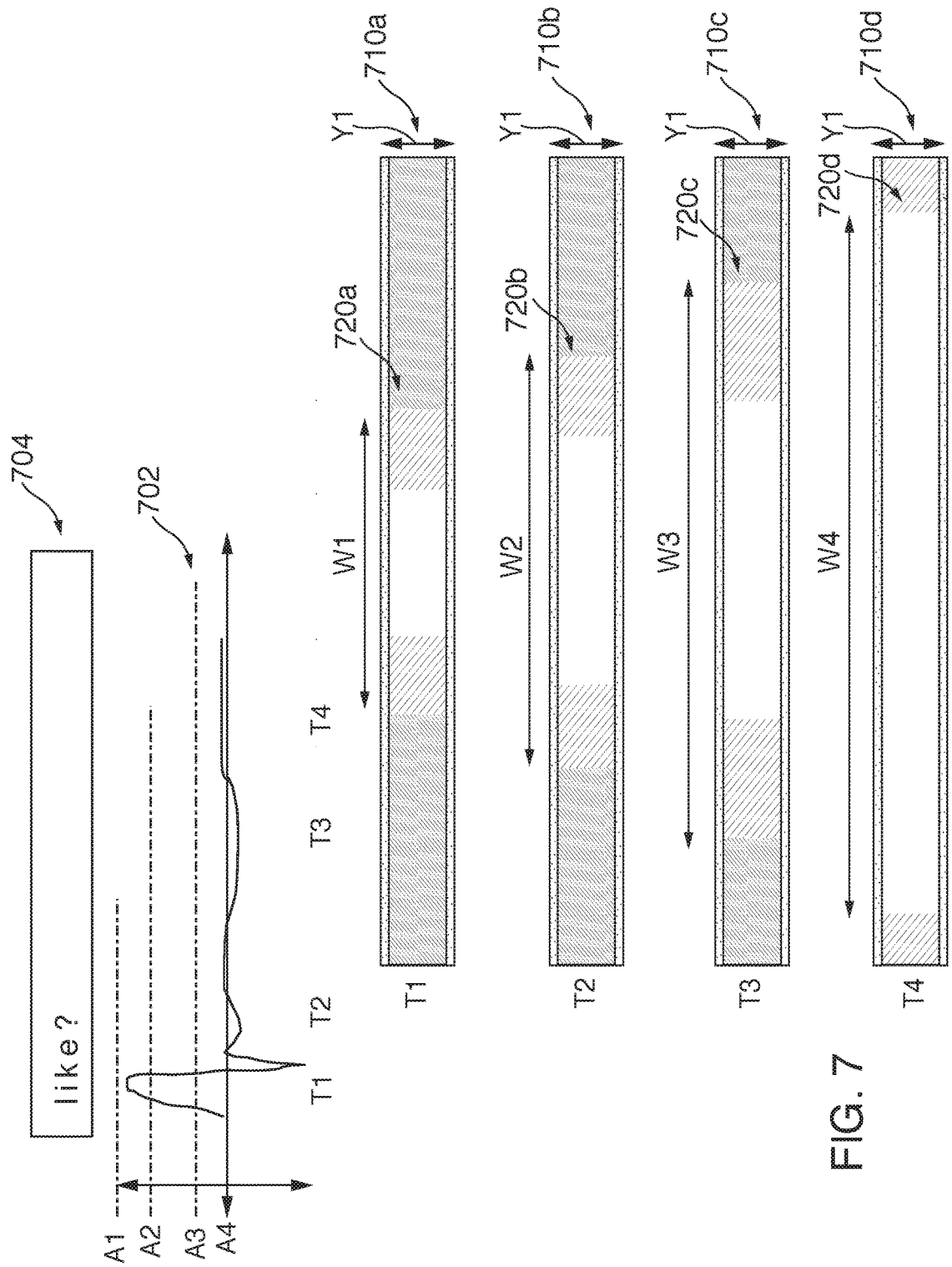
FIG. 7 is another illustrative diagram of exemplary audio indicators having different sizes based on different volume intensities, in accordance with various embodiments.

FIG. 7 is another illustrative diagram of exemplary audio indicators having different sizes based on different volume intensities, in accordance with various embodiments. In FIG. 7, an exemplary waveform 702 is included corresponding to an utterance 704. For example, utterance 704 may correspond to the word "like?" from the end of the utterance 4 of FIG. 1. The word "like," for example, as perceived by the human brain, may correspond to a single phoneme. As seen from waveform 702, during temporal interval T1, the word "like" is uttered. Volume amplitude data received by user device 100 during temporal interval T1 may, upon having an RMS filtering function applied to it, yield a first RMS amplitude A1. During temporal interval T2, the resonating sounds from utterance 704 have begun to taper off, and the volume amplitude data during temporal interval T2 may yield a second RMS amplitude value A2. During temporal intervals T3 and T4, the volume amplitude data of the sounds received may yield third and fourth RMS volume amplitude values A3 and A4, respectively. In the non-limiting embodiment, first RMS amplitude value A1 may be larger than second RMS amplitude value A2, which may be larger than third RMS amplitude value A3, which may still be louder than fourth RMS volume amplitude A4.

Using the RMS amplitude values and the preconfigured maximum/minimum threshold amplitude values stored thereby, user device 100 may determine normalized amplitude values associated with each temporal interval T1-4. For example, first RMS amplitude A1 may be larger as compared with the other normalized amplitudes A2-A4. As an illustrative example, first RMS amplitude value A1 may be associated with a normalized amplitude value of 0.7, second RMS amplitude value A2 may be associated with a normalized amplitude value of 0.5, third RMS amplitude value A3 may be associated with a normalized amplitude value of 0.3, and fourth RMS amplitude value A4 may be associated with a normalized amplitude value of 0.1.

In some embodiments, user device 100 may determine a corresponding width for a main portion of an audio indicator that is to be displayed on a display screen of user device 100 based on the normalized amplitude values. For example, audio indicator 710*a* may be displayed for temporal interval T1. For instance, main portion 720*a* may be of a first width W1, which may be determined based on the first normalized amplitude value for first RMS volume amplitude A1. Similarly, main portion 720*b* of audio indicator 710*b* may be of a second width W2, which may be determined based on the second normalized amplitude value for second RMS volume amplitude A2; main portion 720*c* may be of a third width W3, which may be determined based on the third normalized amplitude value for third RMS volume amplitude A3; and main portion 720*d* may be of a fourth width W4, which may be determined based on the fourth normalized amplitude value for fourth RMS volume amplitude A4. As mentioned previously, RMS volume amplitudes A1-4 may gradually decrease in amplitude. Therefore, user device 100 may generate audio indicators 710a-d, where main portions 720a-d having increasing widths (e.g., W1-W4), inversely related to the decreasing volume of the sounds received during temporal intervals T1-T4. Thus, in the illustrative embodiment, the main portion of the audio indicator (e.g., main portions 720a-d) appear to grow the quieter the volume of the utterance is.

Persons of ordinary skill in the art will recognize that user device 100 may map different normalized amplitude values to different widths of the main portion of an audio indicator. Furthermore, each temporal interval of an utterance may have a different mapping scheme such that two amplitude values that are substantially equal but occurring at different times may yield different widths for the main portion of the utterance. For example, RMS volume amplitude A2 of FIG. 6 and RMS volume amplitude A1 of FIG. 7 may produce substantially similar normalized amplitude values (e.g., the normalized amplitude value for RMS volume amplitude A2 of FIG. 6 may be 0.7, and the normalized amplitude value for RMS volume amplitude A1 of FIG. 7 may also be 0.7). However, the mapping of the normalized amplitude values to widths of the main portion of the audio indicator (e.g., W2 for main portion 620b of audio indicator 610b, and W1 for main portion 720a of audio indicator 710a) need not be equivalent. For instance, the relative mapping of normalized amplitude values to widths of the main portion of an audio indicator may be unique to each temporal duration analyzed by speech-processing system. In this way, each temporal duration has a pattern unique to itself, thereby allowing different parts of a same, or different, utterance, to have unique visual representations displayed.

Furthermore, audio indicator 710a may also have a first height Y1. In some embodiments, the height of audio indicator 710a may be independent on the volume of during each temporal interval. For example, audio indicators 710b, 710c, and 710d may each be first height Y1. In some embodiments, first height may be preconfigured for each audio indicator by user device 100. For example, first height Y1 may be 10% of the height of the display screen. Therefore, if the display screen is 768 pixels in height (e.g., along a vertical axis), then height Y1 would be approximately 76 pixels. However, in some embodiments, as described below, the height of the audio indicators may change based on, amongst other factors, and without limitation, a proximity of an individual to user device 100.

Figure 8:
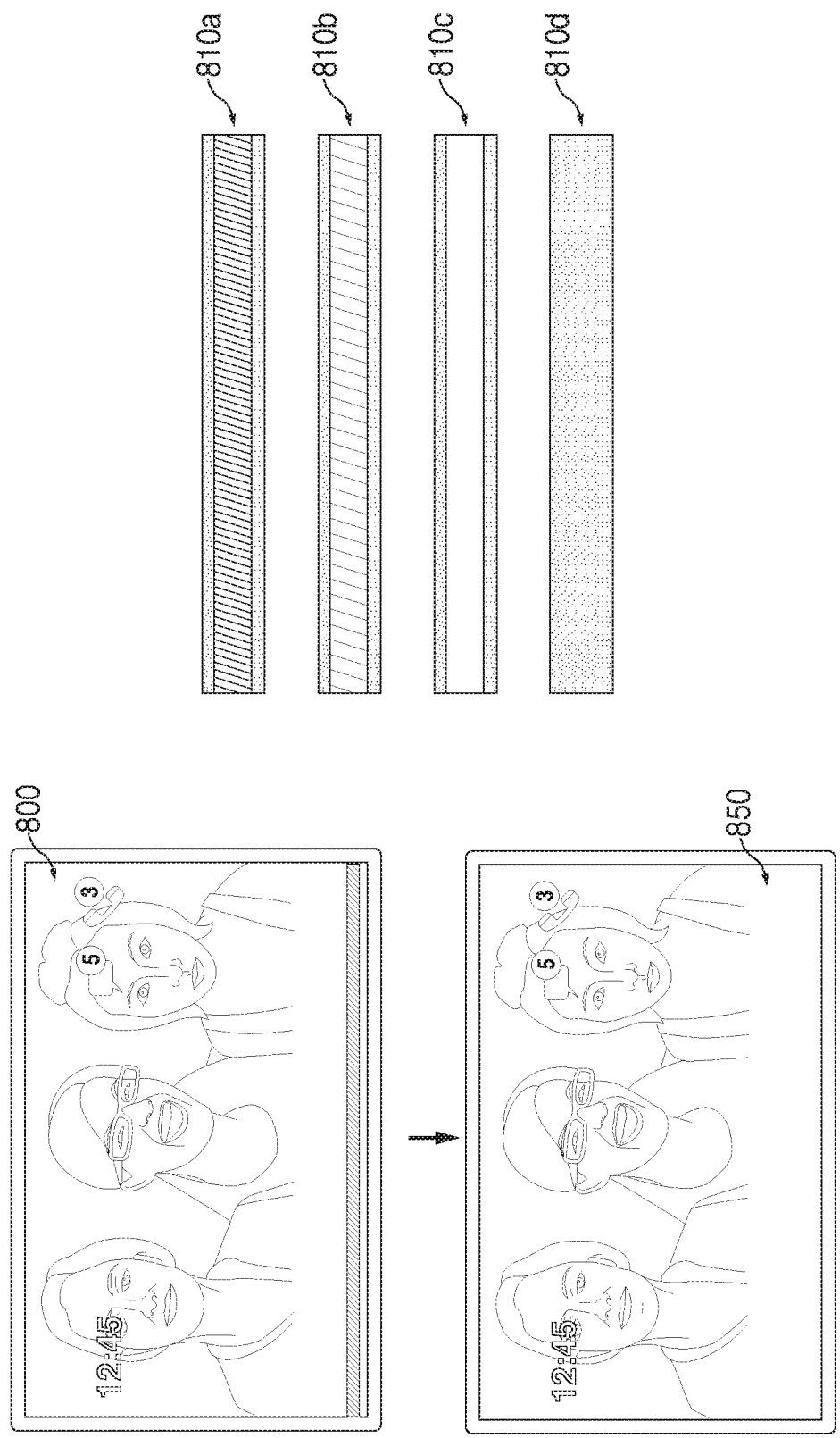
FIG. 8 is an illustrative diagram of exemplary GUIs including audio indicators representative of a user device that has received an indication that a speech endpoint has been determined, in accordance with various embodiments.

FIG. 8 is an illustrative diagram of exemplary GUIs including audio indicators representative of a user device that has received an indication that a speech endpoint has been determined, in accordance with various embodiments. In some embodiments, speech-processing system 200, upon receipt of audio data representing an utterance, such as utterance 4, may perform various speech processing techniques to the audio data to determine an intent of the utterance, as well as cause one or more actions to occur (e.g., turn on a light, provide content, etc.). For example, speech-processing system 200 may perform automatic speech recognition processing using ASR module 258 to the received audio data. For instance, ASR module 258 may generating text data representing the audio data by performing speech-to-text processing to the audio data using STT module 266. The text data may then be provided to NLU module 260, which may use various natural language functionalities to determine an intent of the utterance.

Speech-processing system 200 may also determine, in some embodiments, an endpoint to the utterance's speech. Generally, the speech endpoint may correspond to a temporal location of when speech of an utterance has ended. For example, the utterance, "What is the weather like in Seattle?" may have an end occurring a certain amount of time after the last phoneme of the utterance has been received within audio data representing the utterance has been received by speech-processing system 200. Speech endpointing may, for instance, correspond to a determination of when the presence of human speech is no longer found within received audio data. In some embodiments, determining the speech endpoint may include performing a spectral subtraction of background noise within an audio signal, followed by determining particular characteristics of the audio signal that correspond to speech. Such characteristics may include, for example, an audio signal that exceeds a predefined threshold value associated with background noise. Each word of an utterance may, for instance, have a corresponding waveform, which may be used to determine a textual representation of that word. Separating each word may be a temporally short spacing, corresponding to a decrease in the audio signal to approximately the background level. Differentiating these spaces between words or phonemes, and an end of speech within the utterance may indicate the speech endpoint. In some embodiments, a threshold-based end-pointer may be used to determine the endpoint of the speech. For example, if a temporal duration of the audio data corresponding to non-speech is determined to last for longer than a threshold temporal value, then this may indicate that the speech has ended. Therefore, the start of that temporal duration, or the end of that temporal duration, may be used as the endpoint of the speech.

In response to determining that a speech endpoint has been found, speech-processing system 200 may generate and send an instruction to user device 100 that causes user device 100 to display a particular predefined animation or visual sequence. This animation or sequence may provide a visual indication to an individual that a spoken utterance has been processed by speech-processing system, and a response or action may occur. In some embodiments, the animation may correspond to a pattern of lights or images caused to appear upon display screen 212. For example, user device 100 may have display data stored within memory 204 that indicates a particular image or series of images to be rendered thereby. As an illustrative example, the display data may include an indication that the audio indicator currently being displayed is slowly be faded into a background image current being displayed, or some other image. However, persons of ordinary skill in the art will recognize that any suitable animation may be caused to be performed by user device 100. In some embodiments, the display data representing GUIs for rendering the animation may be generated by speech-processing system 200, and sent to user device 100 to cause user device 100 to display the GUIs.

In one embodiment, a first GUI 800 may be displayed by display screen 212 of user device 100. First GUI 800 may include an audio indicator, such as audio indicator 810a, which may provide a visual representation of the sound (e.g., speech). As seen by audio indicator 810a, the main portion of the audio indicator is substantially the same horizontal width as audio indicator 810a. In other instance, audio indicator 810a may include multiple portions, such as two portions of a substantially similar color slightly spaced apart from one another along a horizontal axis of audio indicator 810a. In still additional instance, audio indicator 810a may be cause to change colors from a first color to a second color.

For example, the first color may be substantially opaque, while the second color may be slightly less opaque (e.g., 25% translucent).

The speech endpoint animation may next include causing a second audio indicator, such as audio indicator 810*b*, to be displayed. Audio indicator 810*b* may be in a slightly more transparent than audio indicator 810*a*. Further still, audio indicators 810*c* and 810*d* may each be even more transparent, in one embodiment, as compared to the previous indicator. For instance, audio indicator 810*a* may be 25% transparent, while indicators 810*b-d* may be 50% transparent, 75% transparent, and 100% transparent. This may allow first GUI 8100 to change into second GUI 850, where in first GUI 800, an audio indicator is visible, but in second GUI 850 no audio indicator is visible. This animation may provide an individual with a substantially seamless transition between the audio indicator being displayed to being not displayed, which may correspond with a particular action to occur. For example, after audio indicator 810*d* is displayed, being substantially transparent, display content may be sent from speech-processing system 200 to user device 100. For example, an image indicating a weather forecast may be displayed by display screen 212 in response to an utterance—"What is the weather like?"—being spoken. Thus, the display area may now display a portion of the image as opposed to having the audio indicator being displayed. However, persons of ordinary skill in the art will recognize that this is merely exemplary, and any suitable image, or series of images, may be displayed on display screen 212, and/or an audio indicator may remain displayed on display screen 212 after speech endpointing occurs. For instance, after speech endpointing occurs, speech-processing system 200 may generate and send display data to user device 100 that causes user device 100 to display an audio indicator of a particular color, or colors, in a particular shape, and/or have a particular size.

Figure 9:
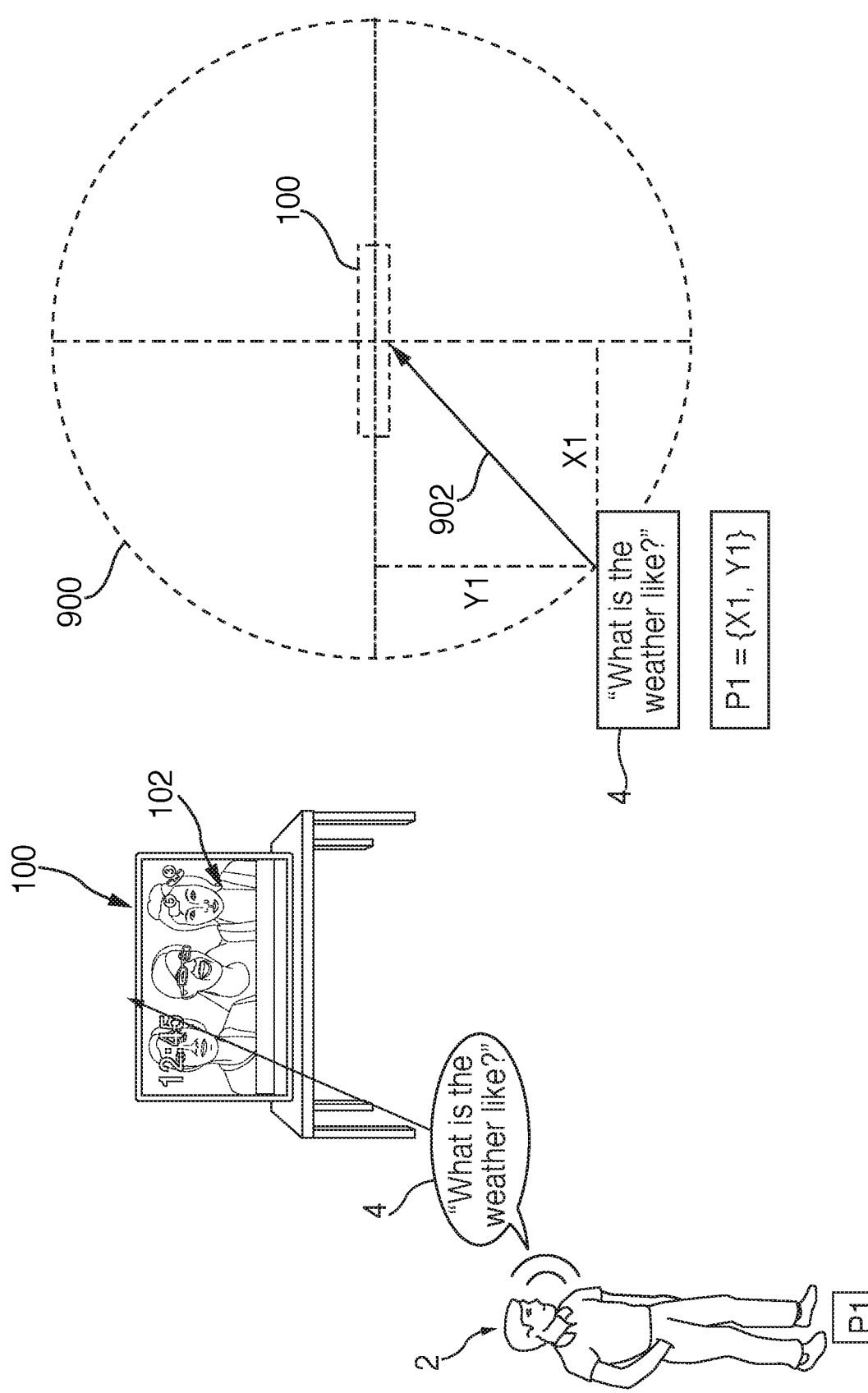
FIG. 9 is an illustrative diagram of an exemplary system for determining a direction that an utterance emanated from, in accordance with various embodiments.

FIG. 9 is an illustrative diagram of an exemplary system for determining a direction that an utterance emanated from, in accordance with various embodiments. In the non-limiting embodiment of FIG. 9, individual 2 may speak utterance 4 in the vicinity of user device 100. For example, individual 2 may say, "What is the weather like?", with the intention of using user device 100 to initiate display weather information and/or audibly output weather information. In some embodiments, user device 100 may send audio data representing utterance 4 to speech-processing system 200, which may include means to determine the intent of utterance 4, and cause one or more actions (e.g., determine a weather forecast associated with a location of user device 100) to occur.

Individual 2, in one embodiment, may be located at a first location P1 from user device 100. For instance, first location P1 may be located on a front side of user device 100 such that individual 2 may be able to view GUI 102 being displayed by display screen 212 of user device 100. In some embodiments, camera(s) 214 may capture one or more images to assist in determining a location of the individual that spoke the utterance. For example, in response to being activated, such as in response to determining that a wakeword has been uttered or that a manual activation trigger has occurred, camera(s) 214 may begin capturing one or more images.

In some embodiments, user device 100 may include one or more microphones 208 capable of receiving audio signals from a 360-degree circumference 900 about user device 100. For instance, user device 100 may include a microphone array having two or more microphones 208. Microphones 208 may be configured in any suitable manner, such as in a circular arrangement, a linear arrangement, or a staggered arrangement. The microphone array, therefore, may be able to determine an approximate direction with which the sound was received from based, at least in part, on the audio signals detected by each microphone 208. For example, the microphone array includes six microphones, arranged in a circular arrangement. Sound originating from a location directly proximate to one of the six microphones will thus have a stronger audio signal than the other five microphones. By analyzing the signal-to-noise ("SNR") ratios of each microphone, and applying various beam forming techniques, a directionality of the sound may be determined.

As seen in FIG. 9, utterance 4 may have originated from individual 2 located at first location P1. Audio signals 900 representing the spoken sounds of utterance 4 may then travel at approximately 343.2 m/s in a direction toward user device 100. Upon receiving audio signal 902, user device 100 may determine an intensity of the sound received by each microphone 208 of user device 100. Then, based on which microphone(s) 208 have the largest sound intensity value, user device 100 may determine a direction that audio signal 902 originated from. For instance, based on a particular microphone 208 having a highest SNR for audio signal 902, user device 100 may determine that utterance 4 originated from a particular horizontal and vertical distance away from user device 100. For example, based on a particular microphone 208 detecting a largest SNR for audio signal 902, user device 100 may determine that audio signal 902 originated from approximately a first side of user device 100, having a horizontal displacement of X1 and a vertical displacement of Y1, where X1 and Y1 are exemplary displacements along a two-dimensional plane of 360-degree circumference 900.

In some embodiments, user device 100 may determine a magnitude of a horizontal displacement X1 (e.g., how far right or left of a center of user device 100) that audio signal 902 is. If the microphone array includes multiple microphones 208, then depending on a magnitude of the SNR of audio signal 902 detected by each microphone 208, an approximate horizontal displacement X1 of audio signal 902 may be determined. As an illustrative example, the microphone array may include five microphones 208 arranged in a linear manner, with one located at a left most position, a left center position, a central position, a right center position, and a right most position. If the SNR of audio signal 902 is largest for the right most positioned microphone, and smallest for the left most positioned microphone, then audio signal 902 likely originated from a right side of user device 100.

In some embodiments, camera(s) 214 may be used in conjunction with microphone(s) 208 to determine an approximate position of individual 2 in order to determine a magnitude of a depth that audio signal 902 originated from. For example, camera(s) 214 may capture one or more images, and using various computer vision techniques, may determine an approximate distance away that individual 2 is located from user device 100. This value may be used alone, and/or in connection with the SNR values obtained by microphone(s) 208, to determine a displacement Y1 of individual 2, thereby allowing user device to approximate a distance away from user device 100 that utterance 4 originated from.

In some embodiments, the displacement Y1 may be used to modify a height of an audio indicator to be displayed by user device 100. For example, sound determined to emanated from a distance closer to user device 100 (e.g., Y1 is substantially small) may cause the corresponding audio indicator, or a portion of the audio indicator, to be displayed having a first height (e.g., a first number of pixels in a vertical direction of display screen 212). If, however, the sound is determined to have emanated from a farther distance from user device 100 (e.g., Y1 is substantially large), then the audio indicator, or a portion of the audio indicator, may be displayed having a second height (e.g., a second number of pixels in the vertical direction). As an illustrative example, the closer distance Y1 is, the smaller the height of the audio indicator may be, whereas the further distance Y1 is, the greater the height the audio indicator may be.

Figure 10:
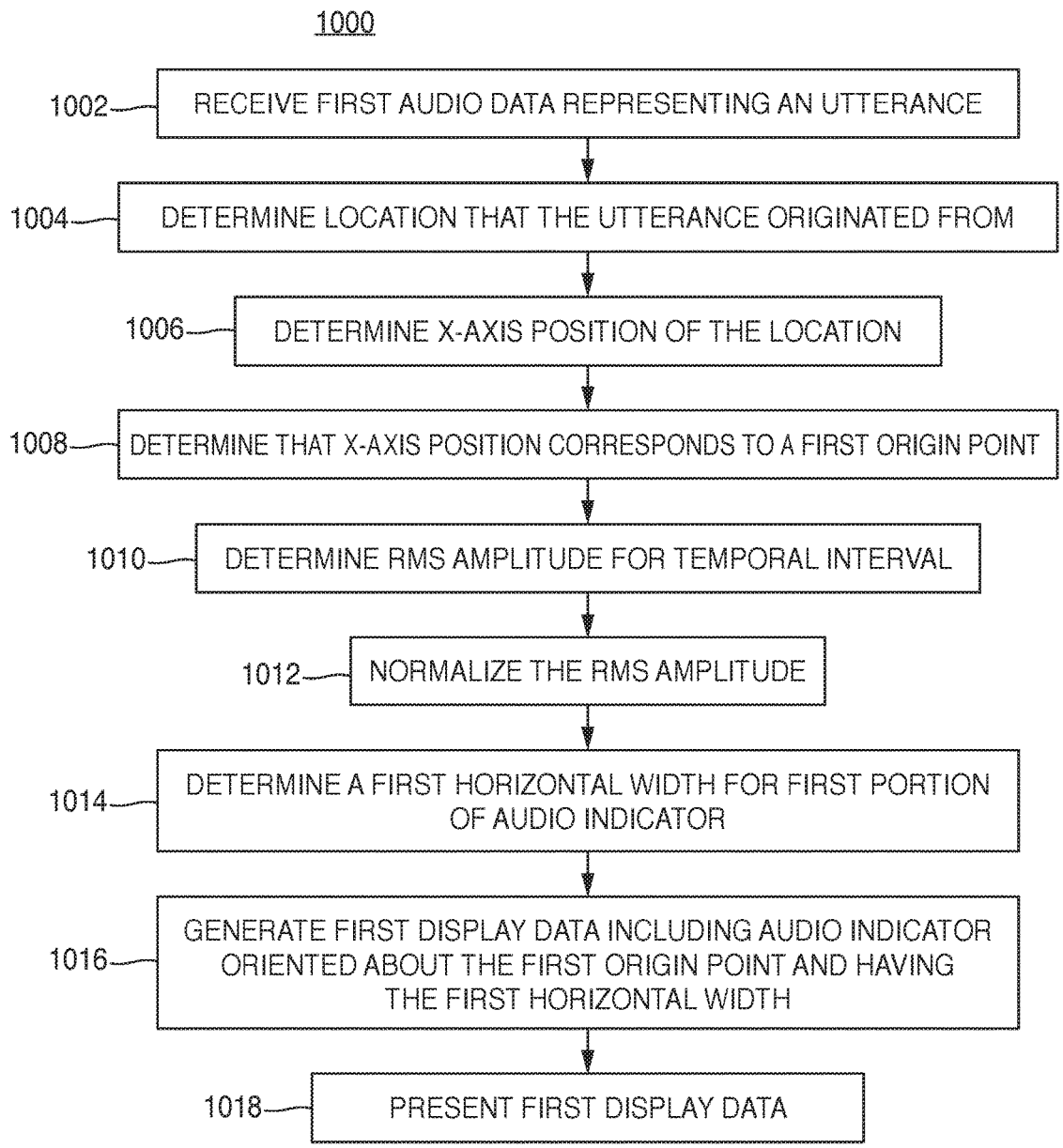
FIG. 10 is an illustrative flowchart of a process for determining a direction that an utterance emanated from, and causing an audio indicator to be displayed that reflects the direction, in accordance with various embodiments.

FIG. 10 is an illustrative flowchart of a process for determining a direction that an utterance emanated from, and causing an audio indicator to be displayed that reflects the direction, in accordance with various embodiments. In the non-limiting exemplary embodiment, process 1000 may begin at step 1002. At step 1002, first audio data representing an utterance may be received by user device 100. For example, audio date representing utterance 4 may be received by one or more microphone(s) 208 of user device 100. In some embodiments, user device 100 may continually receive audio data, and may use keyword spotting functionality to determine whether or not a trigger expression, such as a wakeword, was uttered. If the trigger expression was determined to have been uttered, then user device 100 may continue to step 1004, and/or may simply begin sending the audio data to speech-processing system 200.

At step 1004, user device 100 may determine a location that the utterance originated from. In some embodiments, user device 100 may determine a SNR for each microphone 208 of user device 100. Using the SNR for each microphone 208, user device 100 may be able to determine which microphone 208 received audio data having a largest sound intensity. As an illustrative example, user device 100 may determine an average power of the audio data associated with one or more beams received microphone(s) 208 during a temporal duration for when utterance 4, or any other sound represented by the received audio data, was output. The average power of the audio data may be representative of noise including, for instance, ambient sounds in the local environment where user device 100 is located. The average power, for example, may be determined using a moving average power analysis. The average power of the audio data may be representative of the audio signal (e.g., the speech) combined with ambient noise. User device 100 may then determine the SNR of the audio data as received by each microphone 208. For instance, the SNR may correspond to a ration of the average power of the audio data of each audio beam (e.g., audio signal received by a particular microphone 208) as compared to the average power of the audio data during non-speech related times (e.g., ambient noise levels).

The microphone(s) 208 that has the highest SNR may be selected as being associated with a direction of the audio signal (e.g., audio signal 902) that the individual spoke. For example, a particular microphone 208 may be determined to have the highest SNR as compared to the other microphones 208 of user device 100. This may indicate that that microphone 208 is closest to the source of the audio signal. Therefore, an approximate location of the audio signal's source may be resolved based on the intensity of the audio signal detected by that microphone 208, and the dynamic range that the particular microphone 208 is capable of capturing sound from. For instance, a particular microphone may be optimized for capturing sound within a 60-degree spectrum, and therefore, based on an intensity of the sound, an approximate distance from the microphone may be determined.

At step 1006, an x-axis position of the location may be determined. For example, the determined location from step 1004 may include an x-axis position as well as a y-axis and/or z-axis position. User device 100 may extract the x-axis position from the location information determined previously. Persons of ordinary skill in the will recognize that the use of an x-y coordinate system is merely exemplary, and any suitable coordinate system may be used for determining a location of the audio signal's source. In an illustrative embodiment, the "x-axis" may be associated with an axis oriented along a width of user device 100. For example, an X=0 position along the x-axis may be associated with a mid-point along display screen 100. In this particular example, for instance, if display screen has a width of 10 cm, then the mid-point would be at 5 cm relative to an edge of the display screen. Determining the x-axis position, therefore, may allow user device 100 to determine a distance to one side or another from the mid-point that an utterance originated from. As an illustrative example, in FIG. 9, utterance 4 originated from a location P1. Location P1 had an x-axis component of X=X1, indicating that location P1 was a horizontal distance X1 from a mid-point of a front side of user device 100 where display screen 212 is positioned.

At step 1008, a determination may be made that the x-axis position corresponds to a first origin point along an axis of an audio indicator to be displayed by display screen 212. The audio indicator (e.g., audio indicator 400 of FIG. 4) may include one or more origin points where a main portion, such as main portion 420, may be centered about. In some embodiments, the different origin points may be associated with different positions along the x-axis with which the utterance was determined to have originated from. For example, if the utterance is determined to originate from a "right" side of user device 100, then an origin point shifted to a "right" side of the audio indicator may be selected. This may allow for the main portion to shift along the audio indicator's axis so that the main portion will appear to follow the audio source's position.

An audio indicator may have any number of origin points included thereon. For example, an audio indicator may include five origin points: one located at a center of the audio indicator, one located at a right side, one located at a left side, one located at a right center, and one located at a left center. Persons of ordinary skill in the art will recognize that the use of the terms "right side," "left side," "center," "right center," and "left center" are merely exemplary. As an illustrative example, display screen 212 may be 10 cm in width. Therefore, an audio indicator to be displayed by display screen 212 may have a width of 10 cm, where a center of the audio indicator may be located at 5 cm. In this particular scenario, two more additional origin points may be located on either side of the center, corresponding to a right/left origin point and a right/left center origin point, where the right/left origin points may be located at a X=+3.33 and X=−3.33, respectively (e.g., at 8.33 cm and 1.67 cm, respectively), and the right/left center origin points may be located at X=+1.67 and X=−1.67, respectively (e.g., at 6.67 cm and 3.33 cm, respectively). Alternatively, each origin point may be associated with a particular pixel of the display screen. For example, for a 1024 by 768 pixel array, a "center" may correspond to pixel 512 along the horizontal axis, "left" may correspond to pixel 256 and "right" may correspond to pixel 768, however persons of ordinary skill in the art will recognize that this is merely exemplary.

At step 1008, an RMS amplitude of the first audio data during a temporal duration may be determined. The amplitude may correspond to an intensity, or power, at each sampling time during a particular temporal interval of the utterance. As an illustrative example, in FIG. 6, utterance 604 may have included temporal intervals T1, T2, T3, and T4. At each of these temporal intervals, utterance 604 had a corresponding multiple volume amplitude values corresponding to the various sampled volume levels during that respective temporal interval. User device 100 may apply an RMS filtering function to volume amplitude data representing the sampled amplitude values during that temporal duration to obtain an RMS volume amplitude values for each temporal interval (e.g., RMS amplitude values A1, A2, A3, and A4, respectively). The RMS volume amplitude values may indicate an apparent volume of the speech at each particular instance when a sample was captured for the utterance.

At step 1012, the RMS amplitude value may be normalized relative to the maximum and minimum threshold amplitude volumes. The maximum and minimum threshold amplitude volumes may be preconfigured and stored by user device 100, and may be dependent on a particular device type of user device 100. As an illustrative example, the maximum threshold amplitude volume may be 1, and the minimum threshold amplitude volume may be 0. Therefore, each RMS amplitude value for each sample of the audio data may be associated with a normalized amplitude value between 0 and 1 (where 0 and 1 may be also be included), such that the normalized amplitude value is relative to the maximum/minimum amplitude values. For example, normalized amplitude values closer to 1 may correspond to louder sounds during a particular temporal interval, while normalized amplitude values closer to 0 during the temporal interval may correspond to quieter sounds.

At step 1014, a first horizontal width for the main portion of the audio indicator may be determined using the normalized amplitude values. For example, a first temporal interval, when a first phoneme was uttered, of an utterance may have a first normalized amplitude value, which may be associated with a first width for the main portion of an audio indicator to be displayed by user device 100. For instance, the first normalized amplitude value may be 0.7, and this may map to a width for the main portion of 40% of the width of the audio indicator. Thus, if the audio indicator is 10 cm in width, the main portion would be 4 cm in width. In some embodiments, the mapping between normalized amplitude values and widths for the main portion of the audio indicator may be an inversed relationship. For example, larger normalized amplitude values may be associated with smaller widths for the main portion. Alternatively, however, larger normalized amplitude values may be associated with larger widths. In still further embodiments, the mapping between normalized amplitude values may be associated with different colors, shapes, and/or sizes for the main portion of the audio indicator. For example, larger normalized amplitude values may be associated with a darker color for the main portion of the audio indicator, whereas smaller normalized amplitude values may be associated with a light color for the main portion. However, persons of ordinary skill in the art will recognize that any suitable mapping may be employed for associated normalized amplitude values (or even generally amplitude values) and the size, shape, and/or color of the main portion of the audio indicator, and the use of larger normalized amplitude values being mapped to smaller horizontal widths of the main portion of the audio indicator is merely exemplary.

At step 1016, first display data may be generated, where the first display data includes the audio indicator centered about the first origin point and having the first horizontal width. For example, as seen from FIG. 4, the origin point may be OP1, corresponding to the first position data indicating that the utterance originated from a location substantially centered about user device 100 (e.g., a mid-point of a width of display screen 212). Furthermore, based on the normalized amplitude value, the main portion (e.g., main portion 420) may have a first width W1.

At step 1018, the first display data may be presented using user device 100. User device 100 may include means for rendering a GUI including the audio indicator, where the audio indicator includes a main portion centered at the first origin point (e.g., OP1) and having the determined horizontal width (e.g., W1). For example, display screen 212 may display a graphical audio indicator providing a visual representation of a perceived loudness of spoken words.

Figure 11:
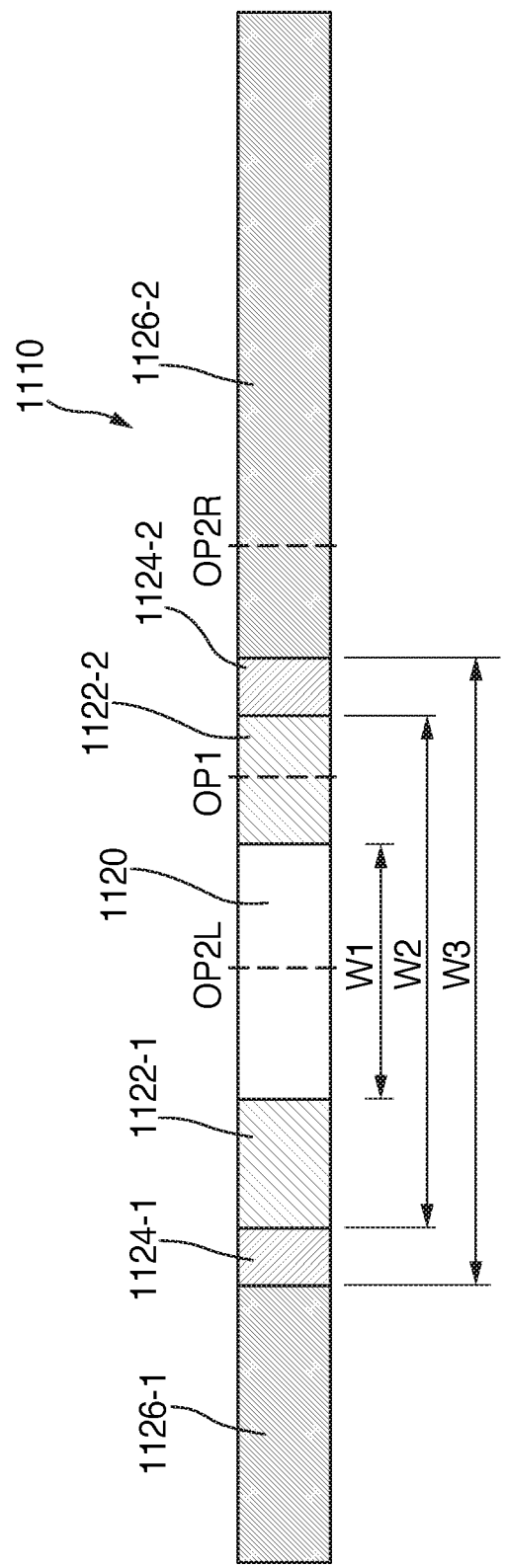
FIG. 11 is an illustrative diagram of an exemplary audio indicator associated with an utterance that is detected to have emanated from a first side of a user device, in accordance with various embodiments.

FIG. 11 is an illustrative diagram of an exemplary audio indicator associated with an utterance that is detected to have emanated from a first side of a user device, in accordance with various embodiments. In the non-limiting embodiment, audio indicator 1110 is displayed. Audio indicator 1110 may be displayed at a particular portion of a graphical user interface. For example, audio indicator 1110 may be displayed at a lower section of a GUI (e.g., audio indicator 106 of GUI 104). In some embodiments, a directionality with which an utterance is received by one or more microphones 208 of user device 100 may cause a main portion 1120 to be centered about a different origin point along an axis of audio indicator 1110 such that main portion 1120 will reflect the direction that the utterance is received.

As mentioned previously, user device 100 may be capable determining an approximate direction with which an utterance originated. For instance, as seen in FIG. 9, individual 2 may be at location P1 relative to a central point of user device 100. Location P1 may be determined using various beam forming techniques, such as by determining a greater signal-to-noise ratio of microphones 208 of user device 100. The approximate horizontal displacement (e.g., a distance to a right or left from a mid-point) may be extracted from location P1. For example, individual 2 may be located a horizontal distance X1 from a mid-point of display screen 212 of user device 100. In this particular scenario, user device 100 may generate first position data that indicates the relative position of individual 2, and thus the direction that utterance 4 originated from.

User device 100 may then determine an origin point for a main portion of the audio indicator to be centered about. For instance, horizontal distance X1, in an exemplary embodiment, may be associated with an origin point OP2L. If main portion 1120 is centered about OP2L, then this may indicate that the source of the audio data may correspond to a "left center" position. As another example, horizontal distance X1 may alternatively correspond to origin point OP2R, which would instead indicate that the source of the audio data corresponds to a "right center" position. Generally speaking, main portion 1120, in one embodiment, may be shifted in a same direction away from a center point of the audio indicator (e.g., OP1) as the direction that the utterance emanated from. By doing this, an individual may be provided with the apparent feel as if main portion 1120 is following them, thereby providing the individual with a greater overall user experience by allowing the individual to visualize a direction that the sound is coming from.

As seen from audio indicator 1110, main portion 1120 may be centered about origin point OP2L, indicating that the sound is originating from a left-center position (e.g., between 30 and 60 degrees from a mid-line of audio indicator 1120). Furthermore, in one embodiment, audio indicator may also include second portions 1122-1 and 1122-2, which may be located on either side of main portion 1120; third portions 1124-1 and 1124-2, which may be located adjacent to second portions 1122-1 and 1122-2, respectively; and fourth portions 1126-1 and 1126-2, which may be located adjacent third portions 1124-1, 1124-2, and extending to either edge of audio indicator 1110. In some embodiments, main portion 1120, second portions 1122-1, 1122-2, third portions 1124-1, 1124-2, and fourth portions 1126-1, 1126-2 may be substantially similar to main portion 402, second portions 404-1, 404-2, third portions 406-1, 406-2, and fourth portions 408-1, 408-2 of FIG. 4, with the exception that the former may be shifted along a horizontal axis of audio indicator 1110 such that main portion 1120 is centered about origin point OP2L as opposed to origin point OP1.

Further still, main portion 1120 may have a width W1, second portions 1122-1, 1122-2 may have widths equal to a difference between widths W2 and W1, third portions 1124-1, 1124-2 may have a width equal to a difference between widths W3 and W2, and fourth portions 1126-1, 1126-2 may have a corresponding equal to a remaining amount of space between an outer edge of third portions 1124-1, 1124-2 and an outer edge of either side of audio indicator 1120. In some embodiments, fourth portion 1126-1 and 1126-2 may differ in size. For example, as main portion 1120 is shifted to one side, an amount of available display space of audio indicator 1110 may be less on that one side, as opposed to the other side. Therefore, in this particular scenario, fourth portion 1126-1 may be smaller in width than fourth portion 1126-2. Similarly, if main portion 1120 was shifted to the other side such that it was centered about origin point OP2R, then fourth portion 1126-2 may be smaller in width than fourth portion 1126-1.

In some embodiments, as mentioned previously, a coloring, shading, size, and/or shape, of each of portions 1120, 1122-1, 1122-2, 1124-1, 1124-2, 1126-1, and 1126-2 may differ. For example, main portion 1120 may be of a first color, such as a light blue. Second portions 1122-1, 1122-2 may be of a second color, such as a darker blue, third portions 1124-1, 1124-2 may be of a third color, such as still yet a darker blue, and fourth portions 1126-1, 1126-2 may be of a fourth color, such as a darkest blue or purple. By having different display patterns for each portion, audio indicator 1110 may allow an individual's focus to be directed to the main portion. Therefore, in combination with modulating the width of main portion 1120 based on a volume of a particular phoneme from an utterance, the individual may be provided with a visual representation of their speech.

FIG. 12 is another illustrative diagram of an exemplary audio indicator associated with an utterance that is detected to have emanated from a first side of a user device, in accordance with various embodiments. In the non-limiting embodiment, an audio indicator 1210 may include a main portion 1220, which may be centered about an origin point OP3L. This may correspond to a scenario where the utterances emanates from a left-most position. For example, audio data representing an utterance (e.g., utterance 4) may indicate that the utterance originated from a position P1. Location P1 may be determined using various beam forming techniques, such as by determining a greater signal-to-noise ratio of microphones 208 of user device 100. The approximate horizontal displacement (e.g., a distance to a right or left from a mid-point) may be extracted from location P1. For example, individual 2 may be located a horizontal distance X1 from a mid-point of display screen 212 of user device 100.

User device 100 may then determine an origin point for a main portion of the audio indicator to be centered about. For instance, horizontal distance X1, in an exemplary embodiment, may be associated with an origin point OP3L. If main portion 1220 is centered about OP3L, then this may indicate that the source of the audio data may correspond to a "left most" position. As another example, horizontal distance X1 may alternatively correspond to origin point OP3R, which would instead indicate that the source of the audio data corresponds to a "right most" position. Generally speaking, main portion 1220, in one embodiment, may be shifted in a same direction away from a center point of the audio indicator (e.g., OP1) as the direction that the utterance emanated from. By doing this, an individual may be provided with the apparent feel as if main portion 1220 is following them, thereby providing the individual with a greater overall user experience by allowing the individual to visualize a direction that the sound is coming from.

As seen from audio indicator 1210, main portion 1220 may be centered about origin point OP3L, indicating that the sound is originating from a left-most position (e.g., between 60 and 90 degrees from a mid-line of audio indicator 1220). If, alternatively, the sound originated from a right-most position (e.g., between −60 and −90 degrees from the mid-line), then main portion 1220 may be centered about origin point OP3R. However, persons of ordinary skill in the art will recognize that any amount of shifting of main portion 1220 may be employed, and the shifting may be proportional to a horizontal position of the sound that is received by user device 100. Referring back to FIG. 9, if the source of the sound were on an opposite plane of user device 100 (e.g., a point P2={X1, −Y1}) such that individual 2 may be located at a back side of user device 100, then user device 100 may still retain a proper positioning of main portion 1220 as the shift may, in one embodiment, be based on the horizontal component of the location of the source sound.

Audio indicator 1220, in one embodiment, may also include second portions 1222-1 and 1222-2, which may be located on either side of main portion 1220; third portions 1224-1 and 1224-2, which may be located adjacent to second portions 1222-1 and 1222-2, respectively; and fourth portions 1226-1 and 1226-2, which may be located adjacent third portions 1224-1, 1224-2, and extending to either edge of audio indicator 1210. In some embodiments, main portion 1220, second portions 1222-1, 1222-2, third portions 1224-1, 1224-2, and fourth portions 1226-1, 1226-2 may be substantially similar to main portion 1120, second portions 1122-1 and 1122-2, third portions 1124-1 and 1124-2, and fourth portions 1126-1 and 1126-2, with the exception that the former may be shifted along a horizontal axis of audio indicator 1210 such that main portion 1220 is centered about origin point OP3L as opposed to origin point OP2L.

Further still, main portion 1220 may have a width W1, second portions 1222-1, 1222-2 may have widths equal to a difference between widths W2 and W1, third portions 1224-1, 1224-2 may have a width equal to a difference between widths W3 and W2, and fourth portions 1226-1, 1226-2 may have a corresponding equal to a remaining amount of space between an outer edge of third portions 1224-1, 1224-2 and an outer edge of either side of audio indicator 1210. In some embodiments, fourth portion 1226-1 and 1226-2 may differ in size. For example, as main portion 1220 is shifted to one side, an amount of available display space of audio indicator 1210 may be less on that one side, as opposed to the other side. Therefore, in this particular scenario, fourth portion 1226-1 may be smaller in width than fourth portion 1226-2. In the illustrative embodiment, fourth portion 1226-1, therefore, has a substantially smaller width than fourth portion 1126-1, as main portion 1220 is shifted by an additional amount equal to a horizontal difference between OP3L and OP2L. Similarly though, if main portion 1220 was shifted to the other side such that it was centered about origin point OP3R, then fourth portion 1226-2 would be smaller in width than fourth portion 1226-1.

In some embodiments, as mentioned previously, a coloring, shading, size, and/or shape, of each of portions 1220, 1222-1, 1222-2, 1224-1, 1224-2, 1226-1, and 1226-2 may differ. For example, main portion 1220 may be of a first color, such as a light blue. Second portions 1222-1, 1222-2 may be of a second color, such as a darker blue, third portions 1224-1, 1124-2 may be of a third color, such as still yet a darker blue, and fourth portions 1226-1, 1226-2 may be of a fourth color, such as a darkest blue or purple. By having different display patterns for each portion, audio indicator 1210 may allow an individual's focus to be directed to the main portion. Therefore, in combination with modulating the width of main portion 1220 based on a volume of a particular phoneme from an utterance, the individual may be provided with a visual representation of their speech.

Figure 13:
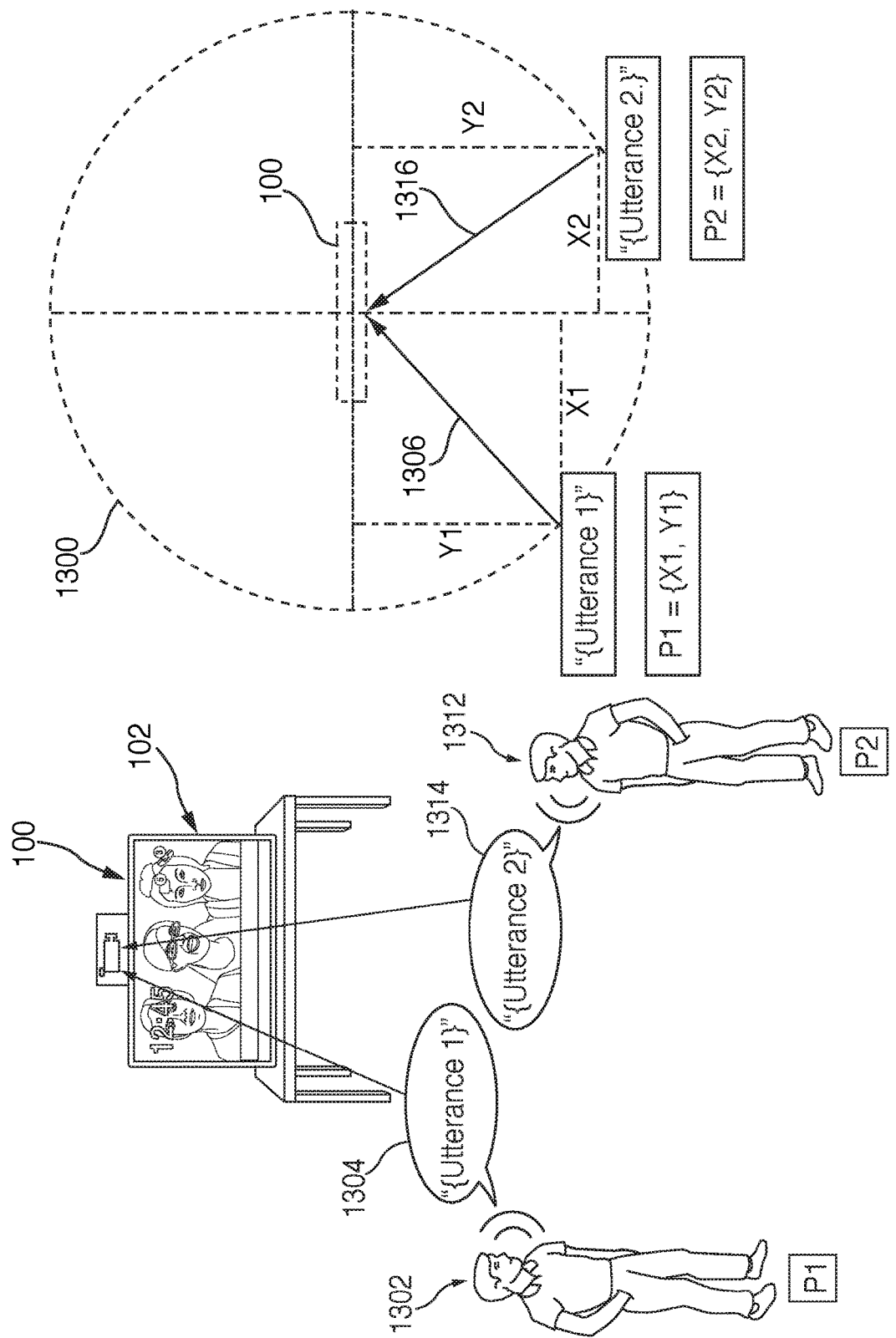
FIG. 13 is an illustrative diagram of an exemplary system for determining that two different utterances were received from two different sources, in accordance with various embodiments.

FIG. 13 is an illustrative diagram of an exemplary system for determining that two different utterances were received from two different sources, in accordance with various embodiments. In the non-limiting embodiment, a first individual 1302 may speak a first utterance 1304 while being located at a first location P1 relative to user device 100 displaying GUI 102. A second individual 1312 may be located at a second location P2, and may speak a second utterance 1314. Microphone(s) 208 of user device 100 may receive first audio data representing first utterance 1304 as well as second audio data representing second utterance 1314. In some embodiments, first utterance 1304 may be spoken by first individual 1302 at a first time, while second utterance 1314 may be spoken by second individual 1312 at a second time, either before or after first utterance 1304 is uttered. In some embodiments, camera(s) 214 may capture one or more images to assist in determining a location of the individuals that spoke the utterance. For example, in response to being activated, such as in response to determining that a wakeword has been uttered or that a manual activation trigger has occurred, camera(s) 214 may begin capturing one or more images.

In some embodiments, user device 100 may include one or more microphones 208 capable of receiving audio signals from a 360-degree circumference 1300 about user device 100. For instance, user device 100 may include a microphone array having two or more microphones 208. Utterance 1304 may have originated from individual 1302 located at first location P1. Audio signals 1306 representing the spoken sounds of utterance 1304 may then travel in a first direction toward user device 100. Upon receiving audio signal 1306, user device 100 may determine an intensity of the sound received by each microphone 208 of user device 100. Then, based on which microphone(s) 208 have the largest sound intensity value, user device 100 may determine a first direction that audio signal 1306 originated from. For instance, based on a particular microphone 208 having a highest SNR for audio signal 1306, user device 100 may determine that utterance 1304 originated from a first horizontal distance and a first vertical distance away from user device 100. For example, based on a particular microphone 208 detecting a largest SNR for audio signal 1306, user device 100 may determine that audio signal 1306 originated from approximately a first side of user device 100, having a horizontal displacement of X1 and a vertical displacement of Y1, where X1 and Y1 are exemplary displacements along a two-dimensional plane of 360-degree circumference 1300. Similarly, utterance 1314 may have originated from individual 1304 located at first location P2. Audio signals 1316 representing the spoken sounds of utterance 1314 may then travel in a second direction toward user device 100. Upon receiving audio signal 1316, user device 100 may determine another intensity of the sound received by each microphone 208 of user device 100. Then, based on which microphone(s) 208 have the largest sound intensity value, user device 100 may determine a second direction that audio signal 1316 originated from. For instance, based on a particular microphone 208 having a highest SNR for audio signal 1316, user device 100 may determine that utterance 1314 originated from a second horizontal distance and a second vertical distance away from user device 100. For example, based on a particular microphone 208 detecting a largest SNR for audio signal 1316, user device 100 may determine that audio signal 1316 originated from approximately a second side of user device 100, having a horizontal displacement of X2 and a vertical displacement of Y2, where X2 and Y2 are exemplary displacements along a two-dimensional plane of 360-degree circumference 1300.

In some embodiments, user device 100 may determine a magnitude of a first and second horizontal displacements X1 and X2 (e.g., how far right or left of a center of user device 100) that audio signals 1306 and 1316 are. If the microphone array includes multiple microphones 208, then depending on a magnitude of the SNR of audio signals 1306 and 1316 detected by each microphone 208, an approximate horizontal displacement X1 of audio signal 1306 and an approximate horizontal displacement X2 may be determined. As an illustrative example, the microphone array may include five microphones 208 arranged in a linear manner, with one located at a left most position, a left center position, a central position, a right center position, and a right most position. If the SNR of audio signal 1306 is largest for the left most positioned microphone, and smallest for the left most positioned microphone, then audio signal 1306 likely originated from a left side of user device 100. If the SNR of audio signal 1316 is largest for the right most positioned microphone, and smallest for the left most positioned microphone, then audio signal 1316 likely originated from a right side of user device 100.

In some embodiments, camera(s) 214 may be used in conjunction with microphone(s) 208 to determine an approximate position of individuals 1302 and 1312 in order to determine a magnitude of a depth that audio signals 1306 and 1316 respectively originated from. For example, camera(s) 214 may capture one or more images, and using various computer vision techniques, may determine an approximate distance away that individuals 1302 and 1312 are located from user device 100. This value may be used alone, and/or in connection with the SNR values obtained by microphone(s) 208, to determine displacement Y1 of individual 1302 and displacement Y2 of individual 1312, thereby allowing user device 100 to approximate a distance away from user device 100 that utterances 1304 and 1314 originated from.

In some embodiments, the displacement Y1 may be used to modify a height of an audio indicator to be displayed by user device 100. For example, sound determined to emanated from a distance closer to user device 100 (e.g., Y1 is substantially small) may cause the corresponding audio indicator, or a portion of the audio indicator, to be displayed having a first height (e.g., a first number of pixels in a vertical direction of display screen 212). If, however, the sound is determined to have emanated from a farther distance from user device 100 (e.g., Y1 is substantially large), then the audio indicator, or a portion of the audio indicator, may be displayed having a second height (e.g., a second number of pixels in the vertical direction). As an illustrative example, the closer distance Y1 is, the smaller the height of the audio indicator may be, whereas the further distance Y1 is, the greater the height the audio indicator may be.

FIG. 14 is an illustrative diagram of an exemplary audio indicator that indicates that two different utterances were received from two different sources, in accordance with various embodiments. Audio indicator 1410 may correspond to an exemplary scenario, such as that of FIG. 13, where two separate utterances are spoken. For instance, two individuals may be playing a game using, or generally interacting with, user device 100. Therefore, in this particular scenario, audio indicator may include two separate main portions, a first main portion 1420-1 and a second main portion 1420-2. In some embodiments, first main portion 1420-1 may be located at a left most origin point OP3L, corresponding to a position P1 of individual 1302, whereas second main portion 1420-2 may be located at a right most origin point OP3R, corresponding to a position P2 of individual 1312. As mentioned previously, depending on a how greater a displacement the sound is determined to be from a center of audio indicator 1410, a main portion of audio indicator 1410 may be shifted proportionally in that same direction. This was seen previously by audio indicators 1110 and 1210 of FIGS. 11 and 12, respectively. In FIG. 14, audio indicator 1410 may include two main portions, first main portion 1420-1 and second main portion 1420-2, which are each shifted to a first and second side based on the determined horizontal displacements X1 and X2 that utterances 1304 and 1314 emanated from.

In some embodiments, audio indicator 1410, therefore, may further include additional portions to assist in highlighting the differences between either individual's corresponding main portion. For instance, adjacent to first main portion 1420-1 may be second portions 1422-1 and 1422-2. Similarly, adjacent second main portion 1420-2 may be second portion 1422-3 and 1422-4. Adjacent to second portions 1422-1 and 1422-2 may be third portions 1424-1 and 1424-2, respectively. Adjacent to second portions 1422-3 and 1422-4 may be third portions 1424-3 and 1424-4. Furthermore, third portion 1426-1 may be located adjacent to third portion 1424-1 and a left edge of audio indicator 1410, whereas third portion 1426-3 may be located adjacent to third portion 1424-4 and a right edge of audio indicator 1410. Third portion 1426-2 may reside adjacent to second portions 1424-2 and 1424-3 such that third portion 1426-2 is sandwiched there between. In some embodiments, the widths of any of portions 1420-1, 1420-2, 1422-1 through 1422-4, 1424-1 through 1424-4, and 1426-1 through 1426-3 may vary depending on a determined location that either utterance originates from.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
receiving, at an electronic device, first audio data representing a first portion of an utterance including a first phoneme, the first portion being of a first temporal duration;
determining a first volume amplitude associated with the first temporal duration using the first audio data;
determining, using the first volume amplitude, a first normalized amplitude value for the first temporal duration relative to a preconfigured maximum volume amplitude value and a preconfigured minimum volume amplitude value;
determining a first horizontal width of an audio indicator based on the first normalized amplitude value;
generating first display data representing a first graphical user interface ("GUI") including the audio indicator, wherein the audio indicator has a plurality of portions with at least one portion based on the amplitude of the first audio data and a first height that is independent of the first volume amplitude; and
displaying the audio indicator using a display screen of the electronic device to visually indicate a first apparent loudness of the first phoneme.

2. The method of claim 1, further comprising:
receiving, at the electronic device, second audio data representing a second portion of the utterance including a second phoneme, the second portion being of a second temporal duration;
determining a second volume amplitude associated with the second temporal duration using the second audio data;
determining, using the second volume amplitude, a second normalized amplitude value for the second temporal duration relative to the preconfigured maximum volume amplitude value and the preconfigured minimum volume amplitude value;
determining a second horizontal width of the audio indicator based on the second normalized amplitude value, the second horizontal width being one of: greater than the first horizontal width or less than the first horizontal width;
generating second display data representing a second GUI including the audio indicator having the second horizontal width and the first height; and
displaying the audio indicator using the display screen visually indicate a second apparent loudness of the second phoneme.

3. The method of claim 1, further comprising:
determining, prior to generating the first display data, that the first portion originated from a first physical location relative to the electronic device;
determining that the audio indicator is to be centered about a first origin point such that the audio indicator visually indicates an apparent positioning of where the utterance emanated from relative to the electronic device, the first origin point visually indicating a relative horizontal location that the utterance emanated from relative to the electronic device.

4. The method of claim 1, further comprising:
receiving, prior to generating the first display data, first image data representing a first image captured by a first camera of the electronic device;
determining a first location of an individual to the display screen based on the first image data;
determining that the audio indicator is the first height based on the first image data, where the first height represents a distance from the utterance to the electronic device such that the audio indicator has a larger height for utterances emanating one of closer to or farther away from the display screen.

5. A method, comprising:
receiving first audio data representing a first utterance;
determining a first sound value associated with the first utterance;
determining, based at least in part on the first sound value, a first indicator value associated with the first utterance, the first indicator value satisfying a first sound threshold;
generating first display data representing a first graphical beam, the first graphical beam having a first portion, a second portion, and a third portion being a first size based, at least in part, on the first indicator value, and the first portion being visually distinguishable from the second portion and the third portion; and
presenting the first display data.

6. The method of claim 5, further comprising:
determining a second sound value associated with the first utterance;
determining, based at least in part on the second sound value, a second indicator value associated with the first utterance, the second indicator value satisfying the first sound threshold;
generating second display data representing the first graphical beam having the first portion, the second portion, and the third portion being of a second size based, at least in part, on the second indicator value; and
presenting the second display data.

7. The method of claim 6, wherein determining the second indicator value further comprises:
determining that the first sound value corresponds to a first amplitude value;
determining that the second sound value corresponds to a second amplitude value, the second amplitude value being greater than the first amplitude value; and
determining that the second indicator value is greater than the first indicator value.

8. The method of claim 5, further comprising:
determining, prior to receiving the first audio data, that the first audio data originated from a first location relative to a user device;
determining that the first location is associated with a first side of the user device; and
determining that the first portion is centered about a first origin point based, at least in part, on the first location.

9. The method of claim 8, further comprising:
receiving second audio data representing a second utterance;
determining that the second audio data originating from a second location;
determining a second sound value associated with the second utterance;
determining, based at least in part on the second sound value, a second indicator value associated with the second utterance, the second indicator value satisfying the first sound threshold;
generating second display data representing a second graphical beam having a fourth portion and a fifth portion being of a second sized based, at least in part, on the second indicator value, the fourth portion being centered about a second origin point based, at least in part, on the second location; and
presenting the second display data at a substantially same time as the first display data such that the first portion is orientated at a first position on the first graphical beam corresponding to the first origin point, and the fourth portion is oriented at a second position on the second graphical beam corresponding to the second origin point.

10. The method of claim 5, further comprising:
sending the audio data to an electronic device to determine a speech endpoint of the first utterance;
receiving an instruction from the electronic device indicating that the speech endpoint has been identified; and
presenting second display data representing a speech endpoint graphic.

11. The method of claim 5, further comprising:
receiving, prior to generating the first display data, first image data representing a first image;
determining that the first image includes an individual;
determining a first distance between the individual and a user device that displays the first graphical beam; and
determining a second indicator value associated with the first distance.

12. The method of claim 11, further comprising:
causing the first portion to be of the first size based on the first indicator value and the second indicator value, the first indicator value corresponding to a width of the first portion, and the second indicator value corresponding to a height of the first portion.

13. A system, comprising:
at least one processor;
communications circuitry; and
a memory including instructions to be operable to be executed by the at least one processor to configure the system to:
receive first audio data representing a first utterance;
determine a first sound value associated with the first utterance;
determine, based at least in part on the first sound value, a first indicator value associated with the first utterance, the first indicator value satisfying a first sound threshold;
generate first display data representing a first graphical beam, the first graphical beam having a first portion, a second portion, and a third portion being a first size based, at least in part, on the first indicator value, and the first portion being visually distinguishable from the second portion and the third portion; and
present the first display data.

14. The system of claim 13, wherein the the memory further comprises instructions that further configure the system to:
determine a second sound value associated with the first utterance;
determine, based at least in part on the second sound value, a second indicator value associated with the first utterance, the second indicator value satisfying the first sound threshold;

generate second display data representing the first graphical beam having the first portion, the second portion, and the third portion being of a second size based, at least in part, on the second indicator value; and present the second display data.

15. The system of claim 14, wherein determination of the second indicator value corresponds to the at least one processor being further operable to:

determine that the first sound value corresponds to a first amplitude value and that the second sound value corresponds to a second amplitude value, the second amplitude value being less than the first amplitude value; and determine that the second indicator value is less than the first indicator value, respectively.

16. The system of claim 13, wherein the memory further comprises instructions that further configure the system to:

determine, prior to the first audio data being received, that the first audio data originated from a first location relative to a user device;

determine that the first location is associated with a first side of the user device; and determine that the first portion is to be centered about a first origin point based, at least in part, on the first location.

17. The system of claim 16, wherein the memory further comprises instructions that further configure the system to:

receive second audio data representing a second utterance;

determine that the second audio data originating from a second location;

determine a second sound value associated with the second utterance;

determine, based at least in part on the second sound value, a second indicator value associated with the second utterance, the second indicator value satisfying the first sound threshold;

generate second display data representing a second graphical beam having a fourth portion and a fifth portion being of a second sized based, at least in part, on the second indicator value, the fourth portion being centered about a second origin point based, at least in part, on the second location; and present the second display data at a substantially same time as the first display data such that the first portion is orientated at a first position on the first graphical beam corresponding to the first origin point, and the fourth portion is oriented at a second position on the second graphical beam corresponding to the second origin point.

18. The system of claim 13, wherein the memory further comprises instructions that further configure the system to:

send the audio data to an electronic device to determine a speech endpoint of the first utterance;

receive an instruction from the electronic device indicating that the speech endpoint has been identified; and present second display data representing a speech endpoint graphic.

19. The system of claim 13, wherein the memory further comprises instructions that further configure the system to:

receive, prior to the first display data being generated, first image data representing a first image;

determine that the first image includes an individual;

determine a first distance between the individual and a user device that displays the first graphical beam; and determine a second indicator value associated with the first distance.

20. The system of claim 19, wherein the memory further comprises instructions that further configure the system to:

cause the first portion to be of the first size based on the first indicator value and the second indicator value, the first indicator value corresponding to a width of the first portion, and the second indicator value corresponding to a height of the first portion.

* * * * *